(12) United States Patent
Kim et al.

(10) Patent No.: US 11,768,369 B2
(45) Date of Patent: Sep. 26, 2023

(54) ASPHERIC MIRROR FOR HEAD-UP DISPLAY SYSTEM AND METHODS FOR FORMING THE SAME

(71) Applicant: CORNING INCORPORATED, Corning, NY (US)

(72) Inventors: BongChul Kim, Asan-si (KR); Taemun Kim, Asan-si (KR); Je-choon Ryoo, Asan-si (KR)

(73) Assignee: Corning Incorporated, Corning, NY (US)

( * ) Notice: Subject to any disclaimer, the term of this patent is extended or adjusted under 35 U.S.C. 154(b) by 525 days.

(21) Appl. No.: 16/766,013

(22) PCT Filed: Nov. 21, 2018

(86) PCT No.: PCT/KR2018/014388
§ 371 (c)(1),
(2) Date: May 21, 2020

(87) PCT Pub. No.: WO2019/103469
PCT Pub. Date: May 31, 2019

(65) Prior Publication Data
US 2020/0278541 A1    Sep. 3, 2020

Related U.S. Application Data

(60) Provisional application No. 62/589,172, filed on Nov. 21, 2017.

(51) Int. Cl.
*B32B 3/02* (2006.01)
*G02B 27/01* (2006.01)
(Continued)

(52) U.S. Cl.
CPC ...... *G02B 27/0101* (2013.01); *C03B 23/0256* (2013.01); *C03C 19/00* (2013.01); *G02B 5/0808* (2013.01)

(58) Field of Classification Search
CPC ..................................................... C03C 19/00
See application file for complete search history.

(56) References Cited

U.S. PATENT DOCUMENTS 2,068,030 A    1/1937 Lieser
2,608,030 A    8/1952 Jendrisak
(Continued)

FOREIGN PATENT DOCUMENTS

CN    1587132 A    3/2005
CN    1860081 A    11/2006
(Continued)

OTHER PUBLICATIONS

Chinese Patent Application No. 201880081360.5, Office Action dated Sep. 22, 2021, 31 pages (21 English Translation and 10 Original Copy); Chinese Patent Office.
(Continued)

*Primary Examiner* — Elizabeth E Mulvaney

(57) ABSTRACT

A glass-based preform for a mirror of a heads-up display (HUD) system, including a glass-based substrate having a first major surface, a second major surface opposite to the first major surface, and a minor surface connecting the first and second major surfaces; a first chamfer at an edge of the first major surface, the first chamfer having a first end at an intersection of the first chamfer and the first major surface and having a second end at an intersection of the first chamfer and the minor surface; and a second chamfer at an edge of the second major surface, the second chamfer having a first end at an intersection of the second chamfer and the second major surface and having a second end at an intersection of the second chamfer and the minor surface. The first chamfer has a different size or shape from the second chamfer.

18 Claims, 8 Drawing Sheets

(51) Int. Cl.
*G02B 5/08* (2006.01)
*C03B 23/025* (2006.01)
*C03C 19/00* (2006.01)

(56) References Cited

U.S. PATENT DOCUMENTS

| | | | |
|---|---|---|---|
| 3,197,903 A | 8/1965 | Walley |
| 3,338,696 A | 8/1967 | Dockerty |
| 3,582,456 A | 6/1971 | Stolki |
| 3,682,609 A | 8/1972 | Dockerty |
| 3,753,840 A | 8/1973 | Plumat |
| 3,778,335 A | 12/1973 | Boyd |
| 3,790,430 A | 2/1974 | Mochel |
| 3,799,817 A | 3/1974 | Laethem |
| 4,147,527 A | 4/1979 | Bystrov et al. |
| 4,238,265 A | 12/1980 | Deminet |
| 4,445,953 A | 5/1984 | Hawk |
| 4,455,338 A | 6/1984 | Henne |
| 4,859,636 A | 8/1989 | Aratani et al. |
| 4,899,507 A | 2/1990 | Mairlot |
| 4,969,966 A | 11/1990 | Norman |
| 4,985,099 A | 1/1991 | Mertens et al. |
| 5,108,480 A | 4/1992 | Sugiyama |
| 5,154,117 A | 10/1992 | Didelot et al. |
| 5,173,102 A | 12/1992 | Weber et al. |
| 5,245,468 A | 9/1993 | Demiryont et al. |
| 5,250,146 A | 10/1993 | Horvath |
| 5,264,058 A | 11/1993 | Hoagland et al. |
| 5,300,184 A | 4/1994 | Masunaga |
| 5,711,119 A | 1/1998 | Cornils et al. |
| 5,897,937 A | 4/1999 | Cornils et al. |
| 6,044,662 A | 4/2000 | Morin |
| 6,086,983 A | 7/2000 | Yoshizawa |
| 6,101,748 A | 8/2000 | Cass et al. |
| 6,242,931 B1 | 6/2001 | Hembree et al. |
| 6,265,054 B1 | 7/2001 | Bravet et al. |
| 6,270,605 B1 | 8/2001 | Doerfler |
| 6,274,219 B1 | 8/2001 | Schuster et al. |
| 6,287,674 B1 | 9/2001 | Verlinden et al. |
| 6,302,985 B1 | 10/2001 | Takahashi et al. |
| 6,332,690 B1 | 12/2001 | Murofushi |
| 6,359,737 B1 | 3/2002 | Stringfellow |
| 6,387,515 B1 | 5/2002 | Joret et al. |
| 6,420,800 B1 | 7/2002 | Levesque et al. |
| 6,426,138 B1 | 7/2002 | Narushima et al. |
| 6,582,799 B1 | 6/2003 | Brown et al. |
| 6,620,365 B1 | 9/2003 | Odoi et al. |
| 6,816,225 B2 | 11/2004 | Colgan et al. |
| 6,903,871 B2 | 6/2005 | Page |
| 7,297,040 B2 | 11/2007 | Chang et al. |
| 7,375,782 B2 | 5/2008 | Yamazaki et al. |
| 7,478,930 B2 | 1/2009 | Choi |
| 7,489,303 B1 | 2/2009 | Pryor |
| 7,542,302 B1 | 6/2009 | Curnalia et al. |
| 7,750,821 B1 | 7/2010 | Taborisskiy et al. |
| 7,955,470 B2 | 6/2011 | Kapp et al. |
| 8,298,431 B2 | 10/2012 | Chwu et al. |
| 8,344,369 B2 | 1/2013 | Yamazaki et al. |
| 8,521,955 B2 | 8/2013 | Arulambalam et al. |
| 8,549,885 B2 | 10/2013 | Dannoux et al. |
| 8,586,492 B2 | 11/2013 | Barefoot et al. |
| 8,652,978 B2 | 2/2014 | Dejneka et al. |
| 8,692,787 B2 | 4/2014 | Imazeki |
| 8,702,253 B2 | 4/2014 | Lu et al. |
| 8,765,262 B2 | 7/2014 | Gross |
| 8,814,372 B2 | 8/2014 | Vandal et al. |
| 8,833,106 B2 | 9/2014 | Dannoux et al. |
| 8,912,447 B2 | 12/2014 | Leong et al. |
| 8,923,693 B2 | 12/2014 | Yeates |
| 8,962,084 B2 | 2/2015 | Brackley et al. |
| 8,967,834 B2 | 3/2015 | Timmerman et al. |
| 8,969,226 B2 | 3/2015 | Dejneka et al. |
| 8,978,418 B2 | 3/2015 | Balduin et al. |
| 9,007,226 B2 | 4/2015 | Chang |
| 9,061,934 B2 | 6/2015 | Bisson et al. |
| 9,090,501 B2 | 7/2015 | Okahata et al. |
| 9,109,881 B2 | 8/2015 | Roussev et al. |
| 9,140,543 B1 | 9/2015 | Allan et al. |
| 9,156,724 B2 | 10/2015 | Gross |
| 9,223,162 B2 | 12/2015 | Deforest et al. |
| 9,240,437 B2 | 1/2016 | Shieh et al. |
| 9,278,500 B2 | 3/2016 | Filipp |
| 9,278,655 B2 | 3/2016 | Jones et al. |
| 9,290,413 B2 | 3/2016 | Dejneka et al. |
| 9,346,703 B2 | 5/2016 | Bookbinder et al. |
| 9,346,706 B2 | 5/2016 | Bazemore et al. |
| 9,357,638 B2 | 5/2016 | Lee et al. |
| 9,442,028 B2 | 9/2016 | Roussev et al. |
| 9,446,723 B2 | 9/2016 | Stepanski |
| 9,469,561 B2 | 10/2016 | Kladias et al. |
| 9,517,967 B2 | 12/2016 | Dejneka et al. |
| 9,555,516 B2 * | 1/2017 | Brown ............... B24B 41/068 |
| 9,573,843 B2 | 2/2017 | Keegan et al. |
| 9,593,042 B2 | 3/2017 | Hu et al. |
| 9,595,960 B2 | 3/2017 | Wilford |
| 9,606,625 B2 | 3/2017 | Levesque et al. |
| 9,617,180 B2 | 4/2017 | Bookbinder et al. |
| 9,663,396 B2 | 5/2017 | Miyasaka et al. |
| 9,694,570 B2 | 7/2017 | Levasseur et al. |
| 9,700,985 B2 | 7/2017 | Kashima et al. |
| 9,701,564 B2 | 7/2017 | Bookbinder et al. |
| 9,720,450 B2 | 8/2017 | Choi et al. |
| 9,724,727 B2 | 8/2017 | Domey et al. |
| 9,802,485 B2 | 10/2017 | Masuda et al. |
| 9,815,730 B2 | 11/2017 | Marjanovic et al. |
| 9,821,509 B2 | 11/2017 | Kastell |
| 9,895,975 B2 | 2/2018 | Lee et al. |
| 9,902,640 B2 | 2/2018 | Dannoux et al. |
| 9,931,817 B2 | 4/2018 | Rickerl |
| 9,933,820 B2 | 4/2018 | Helot et al. |
| 9,947,882 B2 | 4/2018 | Zhang et al. |
| 9,955,602 B2 | 4/2018 | Wildner et al. |
| 9,957,190 B2 | 5/2018 | Finkeldey et al. |
| 9,972,645 B2 | 5/2018 | Kim |
| 9,975,801 B2 | 5/2018 | Maschmeyer et al. |
| 9,992,888 B2 | 6/2018 | Moon et al. |
| 10,005,246 B2 | 6/2018 | Stepanski |
| 10,017,033 B2 | 7/2018 | Fisher et al. |
| 10,042,391 B2 | 8/2018 | Yun et al. |
| 10,074,824 B2 | 9/2018 | Han et al. |
| 10,086,762 B2 | 10/2018 | Uhm |
| 10,131,118 B2 | 11/2018 | Kang et al. |
| 10,140,018 B2 | 11/2018 | Kim et al. |
| 10,153,337 B2 | 12/2018 | Lee et al. |
| 10,175,802 B2 | 1/2019 | Boggs et al. |
| 10,211,416 B2 | 2/2019 | Jin et al. |
| 10,222,825 B2 | 3/2019 | Wang et al. |
| 10,273,184 B2 | 4/2019 | Garner et al. |
| 10,303,223 B2 | 5/2019 | Park et al. |
| 10,303,315 B2 | 5/2019 | Jeong et al. |
| 10,326,101 B2 | 6/2019 | Oh et al. |
| 10,328,865 B2 | 6/2019 | Jung |
| 10,343,377 B2 | 7/2019 | Levasseur et al. |
| 10,347,700 B2 | 7/2019 | Yang et al. |
| 10,377,656 B2 | 8/2019 | Dannoux et al. |
| 10,421,683 B2 | 9/2019 | Schillinger et al. |
| 10,427,383 B2 | 10/2019 | Levasseur et al. |
| 10,444,427 B2 | 10/2019 | Bookbinder et al. |
| 10,483,210 B2 | 11/2019 | Gross et al. |
| 10,500,958 B2 | 12/2019 | Cho et al. |
| 10,606,395 B2 | 3/2020 | Boggs et al. |
| 10,649,267 B2 | 5/2020 | Tuan et al. |
| 10,788,707 B2 | 9/2020 | Ai et al. |
| 10,976,607 B2 | 4/2021 | Huang et al. |
| 11,097,974 B2 * | 8/2021 | Lezzi .................... C03B 29/16 |
| 2002/0039229 A1 | 4/2002 | Hirose et al. |
| 2004/0026021 A1 | 2/2004 | Groh et al. |
| 2004/0069770 A1 | 4/2004 | Cary et al. |
| 2004/0107731 A1 | 6/2004 | Doehring et al. |
| 2004/0258929 A1 | 12/2004 | Glaubitt et al. |
| 2005/0178158 A1 | 8/2005 | Moulding et al. |
| 2006/0227125 A1 | 10/2006 | Wong et al. |
| 2007/0188871 A1 | 8/2007 | Fleury et al. |
| 2007/0195419 A1 | 8/2007 | Tsuda et al. |

(56) References Cited

U.S. PATENT DOCUMENTS

| | | |
|---|---|---|
| 2007/0210621 A1 | 9/2007 | Barton et al. |
| 2007/0221313 A1 | 9/2007 | Franck et al. |
| 2007/0223121 A1 | 9/2007 | Franck et al. |
| 2007/0291384 A1 | 12/2007 | Wang |
| 2008/0031991 A1 | 2/2008 | Choi et al. |
| 2008/0049198 A1 | 2/2008 | Vrachan et al. |
| 2008/0093753 A1 | 4/2008 | Schuetz |
| 2008/0285134 A1 | 11/2008 | Closset et al. |
| 2008/0303976 A1 | 12/2008 | Nishizawa et al. |
| 2009/0096937 A1 | 4/2009 | Bauer et al. |
| 2009/0117332 A1 | 5/2009 | Ellsworth et al. |
| 2009/0179840 A1 | 7/2009 | Tanaka et al. |
| 2009/0185127 A1 | 7/2009 | Tanaka et al. |
| 2009/0201443 A1 | 8/2009 | Sasaki et al. |
| 2009/0311497 A1 | 12/2009 | Aoki |
| 2010/0000259 A1 | 1/2010 | Ukrainczyk et al. |
| 2010/0031590 A1 | 2/2010 | Buchwald et al. |
| 2010/0065342 A1 | 3/2010 | Shaikh |
| 2010/0103138 A1 | 4/2010 | Huang et al. |
| 2010/0182143 A1 | 7/2010 | Lynam |
| 2010/0245253 A1 | 9/2010 | Rhyu et al. |
| 2010/0247977 A1 | 9/2010 | Tsuchiya et al. |
| 2011/0057465 A1 | 3/2011 | Beau et al. |
| 2011/0148267 A1 | 6/2011 | Mcdaniel et al. |
| 2012/0050975 A1 | 3/2012 | Garelli et al. |
| 2012/0111056 A1 | 5/2012 | Prest |
| 2012/0128952 A1 | 5/2012 | Miwa et al. |
| 2012/0134025 A1 | 5/2012 | Hart |
| 2012/0144866 A1 | 6/2012 | Liu et al. |
| 2012/0152897 A1 | 6/2012 | Cheng et al. |
| 2012/0196110 A1 | 8/2012 | Murata et al. |
| 2012/0202030 A1 | 8/2012 | Kondo et al. |
| 2012/0218640 A1 | 8/2012 | Gollier et al. |
| 2012/0263945 A1 | 10/2012 | Yoshikawa |
| 2012/0280368 A1 | 11/2012 | Garner et al. |
| 2012/0320509 A1 | 12/2012 | Kim et al. |
| 2013/0020007 A1 | 1/2013 | Niiyama et al. |
| 2013/0033885 A1 | 2/2013 | Oh et al. |
| 2013/0070340 A1 | 3/2013 | Shelestak et al. |
| 2013/0081428 A1 | 4/2013 | Liu et al. |
| 2013/0088441 A1 | 4/2013 | Chung et al. |
| 2013/0120850 A1 | 5/2013 | Lambert et al. |
| 2013/0186141 A1 | 7/2013 | Henry |
| 2013/0209824 A1 | 8/2013 | Sun et al. |
| 2013/0279188 A1 | 10/2013 | Entenmann et al. |
| 2013/0314642 A1 | 11/2013 | Timmerman et al. |
| 2013/0329346 A1 | 12/2013 | Dannoux et al. |
| 2013/0330495 A1 | 12/2013 | Maatta et al. |
| 2014/0014260 A1 | 1/2014 | Chowdhury et al. |
| 2014/0036428 A1 | 2/2014 | Seng et al. |
| 2014/0065374 A1 | 3/2014 | Tsuchiya et al. |
| 2014/0141206 A1 | 5/2014 | Gillard et al. |
| 2014/0146538 A1 | 5/2014 | Zenker et al. |
| 2014/0153234 A1 | 6/2014 | Knoche et al. |
| 2014/0153894 A1 | 6/2014 | Jenkins et al. |
| 2014/0168153 A1 | 6/2014 | Deichmann et al. |
| 2014/0168546 A1 | 6/2014 | Magnusson et al. |
| 2014/0170388 A1 | 6/2014 | Kashima et al. |
| 2014/0234581 A1 | 8/2014 | Immerman et al. |
| 2014/0333848 A1 | 11/2014 | Chen |
| 2014/0340609 A1 | 11/2014 | Taylor et al. |
| 2015/0015807 A1 | 1/2015 | Franke et al. |
| 2015/0072129 A1 | 3/2015 | Okahata et al. |
| 2015/0077429 A1 | 3/2015 | Eguchi et al. |
| 2015/0168768 A1 | 6/2015 | Nagatani |
| 2015/0177443 A1 | 6/2015 | Faecke et al. |
| 2015/0210588 A1 | 7/2015 | Chang et al. |
| 2015/0246424 A1 | 9/2015 | Venkatachalam et al. |
| 2015/0246507 A1 | 9/2015 | Brown et al. |
| 2015/0274585 A1 | 10/2015 | Rogers et al. |
| 2015/0322270 A1 | 11/2015 | Amin et al. |
| 2015/0351272 A1 | 12/2015 | Wildner et al. |
| 2015/0357387 A1 | 12/2015 | Lee et al. |
| 2016/0009066 A1 | 1/2016 | Nieber et al. |
| 2016/0009068 A1 | 1/2016 | Garner |
| 2016/0016849 A1 | 1/2016 | Allan |
| 2016/0039705 A1 | 2/2016 | Kato et al. |
| 2016/0052241 A1 | 2/2016 | Zhang |
| 2016/0066463 A1 | 3/2016 | Yang et al. |
| 2016/0081204 A1 | 3/2016 | Park et al. |
| 2016/0083282 A1 | 3/2016 | Jouanno et al. |
| 2016/0083292 A1 | 3/2016 | Tabe et al. |
| 2016/0091645 A1 | 3/2016 | Birman et al. |
| 2016/0102015 A1 | 4/2016 | Yasuda et al. |
| 2016/0113135 A1 | 4/2016 | Kim et al. |
| 2016/0207290 A1 | 7/2016 | Cleary et al. |
| 2016/0216434 A1 | 7/2016 | Shih et al. |
| 2016/0250982 A1 | 9/2016 | Fisher et al. |
| 2016/0252656 A1 | 9/2016 | Waldschmidt et al. |
| 2016/0272529 A1 | 9/2016 | Hong et al. |
| 2016/0280590 A1* | 9/2016 | Kashima ................ C03C 21/00 |
| 2016/0297176 A1 | 10/2016 | Rickerl |
| 2016/0306451 A1 | 10/2016 | Isoda et al. |
| 2016/0313494 A1 | 10/2016 | Hamilton et al. |
| 2016/0354996 A1 | 12/2016 | Alder et al. |
| 2016/0355091 A1 | 12/2016 | Lee et al. |
| 2016/0355901 A1 | 12/2016 | Isozaki et al. |
| 2016/0375808 A1 | 12/2016 | Etienne et al. |
| 2017/0008377 A1 | 1/2017 | Fisher et al. |
| 2017/0021661 A1 | 1/2017 | Pelucchi |
| 2017/0066223 A1 | 3/2017 | Notsu et al. |
| 2017/0081238 A1 | 3/2017 | Jones et al. |
| 2017/0088454 A1 | 3/2017 | Fukushima et al. |
| 2017/0094039 A1 | 3/2017 | Lu |
| 2017/0115944 A1 | 4/2017 | Oh et al. |
| 2017/0158551 A1 | 6/2017 | Bookbinder et al. |
| 2017/0160434 A1 | 6/2017 | Hart et al. |
| 2017/0185289 A1 | 6/2017 | Kim et al. |
| 2017/0190152 A1 | 7/2017 | Notsu et al. |
| 2017/0197561 A1 | 7/2017 | Mcfarland |
| 2017/0213872 A1 | 7/2017 | Jinbo et al. |
| 2017/0217290 A1 | 8/2017 | Yoshizumi et al. |
| 2017/0217815 A1 | 8/2017 | Dannoux et al. |
| 2017/0240772 A1 | 8/2017 | Dohner et al. |
| 2017/0247291 A1 | 8/2017 | Hatano et al. |
| 2017/0262057 A1 | 9/2017 | Knittl et al. |
| 2017/0263690 A1 | 9/2017 | Lee et al. |
| 2017/0274627 A1 | 9/2017 | Chang et al. |
| 2017/0285227 A1 | 10/2017 | Chen et al. |
| 2017/0305786 A1 | 10/2017 | Roussev et al. |
| 2017/0327402 A1 | 11/2017 | Fujii et al. |
| 2017/0334770 A1 | 11/2017 | Luzzato et al. |
| 2017/0349473 A1 | 12/2017 | Moriya et al. |
| 2018/0009197 A1 | 1/2018 | Gross et al. |
| 2018/0014420 A1 | 1/2018 | Amin et al. |
| 2018/0031743 A1 | 2/2018 | Wakatsuki et al. |
| 2018/0050948 A1 | 2/2018 | Faik et al. |
| 2018/0069053 A1 | 3/2018 | Bok |
| 2018/0072022 A1 | 3/2018 | Tsai et al. |
| 2018/0103132 A1 | 4/2018 | Prushinskiy et al. |
| 2018/0111569 A1 | 4/2018 | Faik et al. |
| 2018/0122863 A1 | 5/2018 | Bok |
| 2018/0125228 A1 | 5/2018 | Porter et al. |
| 2018/0134232 A1 | 5/2018 | Helot |
| 2018/0141850 A1 | 5/2018 | Dejneka et al. |
| 2018/0147985 A1 | 5/2018 | Brown et al. |
| 2018/0149777 A1 | 5/2018 | Brown |
| 2018/0149907 A1 | 5/2018 | Gahagan et al. |
| 2018/0164850 A1 | 6/2018 | Sim et al. |
| 2018/0186674 A1 | 7/2018 | Kumar et al. |
| 2018/0188869 A1 | 7/2018 | Boggs et al. |
| 2018/0208131 A1 | 7/2018 | Mattelet et al. |
| 2018/0208494 A1 | 7/2018 | Mattelet et al. |
| 2018/0210118 A1 | 7/2018 | Gollier et al. |
| 2018/0215125 A1 | 8/2018 | Gahagan |
| 2018/0245125 A1 | 8/2018 | Tsai et al. |
| 2018/0290438 A1 | 10/2018 | Notsu et al. |
| 2018/0304825 A1 | 10/2018 | Mattelet et al. |
| 2018/0324964 A1 | 11/2018 | Yoo et al. |
| 2018/0345644 A1 | 12/2018 | Kang et al. |
| 2018/0364760 A1 | 12/2018 | Ahn et al. |
| 2018/0374906 A1 | 12/2018 | Everaerts et al. |
| 2019/0034017 A1 | 1/2019 | Boggs et al. |
| 2019/0039352 A1 | 2/2019 | Zhao et al. |

(56) References Cited

U.S. PATENT DOCUMENTS

| | | | |
|---|---|---|---|
| 2019/0039935 A1 | 2/2019 | Couillard et al. | |
| 2019/0069451 A1 | 2/2019 | Myers et al. | |
| 2019/0077337 A1 | 3/2019 | Gervelmeyer | |
| 2019/0152831 A1 | 5/2019 | An et al. | |
| 2019/0223309 A1 | 7/2019 | Amin et al. | |
| 2019/0295494 A1 | 9/2019 | Wang et al. | |
| 2019/0315648 A1 | 10/2019 | Kumar et al. | |
| 2019/0329531 A1 | 10/2019 | Brennan et al. | |
| 2020/0052245 A1 | 2/2020 | Qiao et al. | |
| 2020/0064535 A1 | 2/2020 | Haan et al. | |
| 2020/0278541 A1 | 9/2020 | Kim et al. | |
| 2020/0301192 A1 | 9/2020 | Huang et al. | |
| 2021/0055599 A1 | 2/2021 | Chen et al. | |

FOREIGN PATENT DOCUMENTS

| | | |
|---|---|---|
| CN | 101600846 A | 12/2009 |
| CN | 101684032 A | 3/2010 |
| CN | 201989544 U | 9/2011 |
| CN | 102341356 A | 2/2012 |
| CN | 102464456 A | 5/2012 |
| CN | 102566841 A | 7/2012 |
| CN | 103136490 A | 6/2013 |
| CN | 103587161 A | 2/2014 |
| CN | 203825589 U | 9/2014 |
| CN | 204111583 U | 1/2015 |
| CN | 104656999 A | 5/2015 |
| CN | 104679341 A | 6/2015 |
| CN | 204463066 U | 7/2015 |
| CN | 104843976 A | 8/2015 |
| CN | 105118391 A | 12/2015 |
| CN | 105511127 A | 4/2016 |
| CN | 205239166 U | 5/2016 |
| CN | 105705330 A | 6/2016 |
| CN | 106256794 A | 12/2016 |
| CN | 205905907 U | 1/2017 |
| CN | 106458683 A | 2/2017 |
| CN | 206114596 U | 4/2017 |
| CN | 206114956 U | 4/2017 |
| CN | 107613809 A | 1/2018 |
| CN | 107757516 A | 3/2018 |
| CN | 108519831 A | 9/2018 |
| CN | 108550587 A | 9/2018 |
| CN | 108725350 A | 11/2018 |
| CN | 109135605 A | 1/2019 |
| CN | 109690662 A | 4/2019 |
| CN | 109743421 A | 5/2019 |
| CN | 111758063 A | 10/2020 |
| DE | 4415787 A1 | 11/1995 |
| DE | 4415878 A1 | 11/1995 |
| DE | 69703490 T2 | 5/2001 |
| DE | 102004022008 A1 | 12/2004 |
| DE | 102004002208 A1 | 8/2005 |
| DE | 102009021938 A1 | 11/2010 |
| DE | 102010007204 A1 | 8/2011 |
| DE | 102013214108 A1 | 2/2015 |
| DE | 102014116798 A1 | 5/2016 |
| EP | 0076924 A2 | 4/1983 |
| EP | 0316224 A1 | 5/1989 |
| EP | 0347049 A2 | 12/1989 |
| EP | 0418700 A1 | 3/1991 |
| EP | 0423698 A1 | 4/1991 |
| EP | 0525970 A1 | 2/1993 |
| EP | 0664210 A1 | 7/1995 |
| EP | 1013622 A1 | 6/2000 |
| EP | 1031409 A1 | 8/2000 |
| EP | 1046493 A2 | 10/2000 |
| EP | 0910721 B1 | 11/2000 |
| EP | 1647663 A1 | 4/2006 |
| EP | 2236281 A1 | 10/2010 |
| EP | 2385630 A2 | 11/2011 |
| EP | 2521118 A2 | 11/2012 |
| EP | 2852502 A2 | 4/2015 |
| EP | 2933718 A1 | 10/2015 |
| EP | 3093181 A2 | 11/2016 |
| EP | 3100854 A1 | 12/2016 |
| EP | 3118174 A1 | 1/2017 |
| EP | 3118175 A1 | 1/2017 |
| EP | 3144141 A1 | 3/2017 |
| EP | 3156286 A1 | 4/2017 |
| EP | 3189965 A1 | 7/2017 |
| EP | 3288791 A1 | 3/2018 |
| EP | 3426614 A1 | 1/2019 |
| EP | 3532442 A1 | 9/2019 |
| EP | 3714316 A1 | 9/2020 |
| FR | 2750075 A1 | 12/1997 |
| FR | 2918411 A1 | 1/2009 |
| FR | 3012073 A1 | 4/2015 |
| GB | 0805770 A | 12/1958 |
| GB | 0991867 A | 5/1965 |
| GB | 1319846 A | 6/1973 |
| GB | 2011316 A | 7/1979 |
| GB | 2281542 A | 3/1995 |
| JP | 55-154329 | 12/1980 |
| JP | 57-048082 A | 3/1982 |
| JP | 58-073681 A | 5/1983 |
| JP | 58-194751 | 11/1983 |
| JP | 59-076561 A | 5/1984 |
| JP | 63-089317 A | 4/1988 |
| JP | 63-190730 | 8/1988 |
| JP | 03-059337 U | 6/1991 |
| JP | 3059337 U | 6/1991 |
| JP | 03-228840 A | 10/1991 |
| JP | 04-119931 | 4/1992 |
| JP | 05-116972 A | 5/1993 |
| JP | 06-340029 A | 12/1994 |
| JP | 10-218630 A | 8/1998 |
| JP | 11-001349 A | 1/1999 |
| JP | 11-006029 A | 1/1999 |
| JP | 11-059172 A | 3/1999 |
| JP | 11-060293 A | 3/1999 |
| JP | 2000-260330 A | 9/2000 |
| JP | 2002-255574 A | 9/2002 |
| JP | 2003-500260 A | 1/2003 |
| JP | 2003-276571 A | 10/2003 |
| JP | 2003-321257 A | 11/2003 |
| JP | 2004-101712 A | 4/2004 |
| JP | 2004-284839 A | 10/2004 |
| JP | 2006-181936 A | 7/2006 |
| JP | 2007-188035 A | 7/2007 |
| JP | 2007-197288 A | 8/2007 |
| JP | 2010-145731 A | 7/2010 |
| JP | 2010-257562 A | 11/2010 |
| JP | 2012-111661 A | 6/2012 |
| JP | 2013-084269 A | 5/2013 |
| JP | 2014-126564 A | 7/2014 |
| JP | 2015-502901 A | 1/2015 |
| JP | 2015-092422 A | 5/2015 |
| JP | 5748082 B2 | 7/2015 |
| JP | 5796561 B2 | 10/2015 |
| JP | 2016-500458 A | 1/2016 |
| JP | 2016-031696 A | 3/2016 |
| JP | 2016-037446 A | 3/2016 |
| JP | 2016-517380 A | 6/2016 |
| JP | 2016-130810 A | 7/2016 |
| JP | 2016-144008 A | 8/2016 |
| JP | 5976561 B2 | 8/2016 |
| JP | 2016-173794 A | 9/2016 |
| JP | 2016-530204 A | 9/2016 |
| JP | 2016-203609 A | 12/2016 |
| JP | 2016-207200 A | 12/2016 |
| JP | 6281825 B2 | 2/2018 |
| JP | 6340029 B2 | 6/2018 |
| JP | 2021-507273 A | 2/2021 |
| KR | 2002-0019045 A | 3/2002 |
| KR | 10-0479282 B1 | 8/2005 |
| KR | 10-2008-0023888 A | 3/2008 |
| KR | 10-2013-0005776 A | 1/2013 |
| KR | 10-2014-0111403 A | 9/2014 |
| KR | 10-2015-0026911 A | 3/2015 |
| KR | 10-2015-0033969 A | 4/2015 |
| KR | 10-2015-0051458 A | 5/2015 |
| KR | 10-1550833 B1 | 9/2015 |
| KR | 10-2015-0121101 A | 10/2015 |

(56) References Cited

FOREIGN PATENT DOCUMENTS

| | | |
|---|---|---|
| KR | 10-2016-0118746 A | 10/2016 |
| KR | 10-1674060 B1 | 11/2016 |
| KR | 10-2016-0144008 A | 12/2016 |
| KR | 10-2017-0000208 A | 1/2017 |
| KR | 10-2017-0106263 A | 9/2017 |
| KR | 10-2017-0107124 A | 9/2017 |
| KR | 10-2017-0113822 A | 10/2017 |
| KR | 10-2017-0121674 A | 11/2017 |
| KR | 10-2018-0028597 A | 3/2018 |
| KR | 10-2018-0049484 A | 5/2018 |
| KR | 10-2018-0049780 A | 5/2018 |
| KR | 10-2019-0001864 A | 1/2019 |
| KR | 10-2019-0081264 A | 7/2019 |
| TW | 200704268 A | 1/2007 |
| TW | 201438895 A | 10/2014 |
| TW | 201546006 A | 12/2015 |
| TW | 201636309 A | 10/2016 |
| TW | 201637857 A | 11/2016 |
| TW | 201928469 A | 7/2019 |
| VN | 58334 | 7/2018 |
| WO | 94/25272 A1 | 11/1994 |
| WO | 97/39074 A1 | 10/1997 |
| WO | 98/01649 A1 | 1/1998 |
| WO | 00/73062 A1 | 12/2000 |
| WO | 2006/095005 A1 | 9/2006 |
| WO | 2007/108861 A1 | 9/2007 |
| WO | 2008/042731 A1 | 4/2008 |
| WO | 2008/153484 A1 | 12/2008 |
| WO | 2009/072530 A1 | 6/2009 |
| WO | 2011/029852 A1 | 3/2011 |
| WO | 2011/144359 A1 | 11/2011 |
| WO | 2011/155403 A1 | 12/2011 |
| WO | 2012/005307 A1 | 1/2012 |
| WO | 2012/058084 A2 | 5/2012 |
| WO | 2012/166343 A2 | 12/2012 |
| WO | 2013/031547 A1 | 3/2013 |
| WO | 2013/072611 A1 | 5/2013 |
| WO | 2013/072612 A1 | 5/2013 |
| WO | 2013/174715 A1 | 11/2013 |
| WO | 2013/175106 A2 | 11/2013 |
| WO | 2014/085663 A1 | 6/2014 |
| WO | 2014/107640 A1 | 7/2014 |
| WO | 2014/172237 A2 | 10/2014 |
| WO | 2014/175371 A1 | 10/2014 |
| WO | 2015/031594 A2 | 3/2015 |
| WO | 2015/055583 A1 | 4/2015 |
| WO | 2015/057552 A2 | 4/2015 |
| WO | 2015/084902 A1 | 6/2015 |
| WO | 2015/085283 A1 | 6/2015 |
| WO | 2015/141966 A1 | 9/2015 |
| WO | 2016/007815 A1 | 1/2016 |
| WO | 2016/007843 A1 | 1/2016 |
| WO | 2016/010947 A1 | 1/2016 |
| WO | 2016/010949 A1 | 1/2016 |
| WO | 2016/044360 A1 | 3/2016 |
| WO | 2016/069113 A1 | 5/2016 |
| WO | 2016/070974 A1 | 5/2016 |
| WO | 2016/115311 A1 | 7/2016 |
| WO | 2016/125713 A1 | 8/2016 |
| WO | 2016/136758 A1 | 9/2016 |
| WO | 2016/173699 A1 | 11/2016 |
| WO | 2016/183059 A1 | 11/2016 |
| WO | 2016/195301 A1 | 12/2016 |
| WO | 2016/196531 A1 | 12/2016 |
| WO | 2016/196546 A1 | 12/2016 |
| WO | 2016/202605 A1 | 12/2016 |
| WO | 2017/015392 A1 | 1/2017 |
| WO | 2017/019851 A1 | 2/2017 |
| WO | 2017/023673 A1 | 2/2017 |
| WO | 2017/106081 A1 | 6/2017 |
| WO | 2017/110560 A1 | 6/2017 |
| WO | 2017/146866 A1 | 8/2017 |
| WO | 2017/155932 A1 | 9/2017 |
| WO | 2017/158031 A1 | 9/2017 |
| WO | 2018/005646 A1 | 1/2018 |
| WO | 2018/009504 A1 | 1/2018 |
| WO | 2018/015392 A1 | 1/2018 |
| WO | 2018/075853 A1 | 4/2018 |
| WO | 2018/081068 A1 | 5/2018 |
| WO | 2018/102332 A1 | 6/2018 |
| WO | 2018/125683 A1 | 7/2018 |
| WO | 2018/160812 A2 | 9/2018 |
| WO | 2018/200454 A1 | 11/2018 |
| WO | 2018/200807 A1 | 11/2018 |
| WO | 2018/213267 A1 | 11/2018 |
| WO | 2019/055469 A1 | 3/2019 |
| WO | 2019/055652 A1 | 3/2019 |
| WO | 2019/074800 A1 | 4/2019 |
| WO | 2019/075065 A1 | 4/2019 |
| WO | 2019/151618 A1 | 8/2019 |

OTHER PUBLICATIONS

"Stainless Steel—Grade 410 (UNS S41000)", available online at <https://www.azom.com/article.aspx?ArticleID=970>, Oct. 23, 2001, 5 pages.
"Standard Test Method for Measurement of Glass Stress—Optical Coefficient", ASTM International, Designation: C770-16, 2016.
Ashley Klamer, "Dead front overlays", Marking Systems, Inc., Jul. 8, 2013, 2 pages.
ASTM C1279-13 "Standard Test Method for Non-Destructive Photoelastic Measurement of Edge and Surface Stresses in Annealed, Heat-Strengthened, and Fully Tempered Flat Glass"; Downloaded Jan. 24, 2018; 11 Pages.
ASTM C1422/C1422M-10 "Standard Specification for Chemically Strengthened Flat Glass"; Downloaded Jan. 24, 2018; 5 pages.
ASTM Standard C770-98 (2013), "Standard Test Method for Measurement of Glass Stress-Optical Coefficient".
Burchardt et al., (Editorial Team), Elastic Bonding: The basic principles of adhesive technology and a guide to its cost-effective use in industry, 2006, 71 pages.
Byun et al; "A Novel Route for Thinning of LCD Glass Substrates"; SID 06 DIGEST; pp. 1786-1788, v37, 2006.
Datsiou et al., "Behaviour of cold bent glass plates during the shaping process", Engineered Transparency. International Conference atglasstec, Dusseldorf, Germany, Oct. 21 and 22, 2014, 9 pages.
Engineering ToolBox, "Coefficients of Linear Thermal Expansion", available online at <https://www.engineeringtoolbox.com/linear-expansion-coefficients-d_95.html>, 2003, 9 pages.
Faurecia "Intuitive HMI for a Smart Life on Board" (2018); 8 Pages http://www.faurecia.com/en/innovation/smart-life-board/intuitive-HMI.
Faurecia: Smart Pebbles, Nov. 10, 2016 (Nov. 10, 2016), XP055422209, Retrieved from the Internet: URL:https://web.archive.org/web/20171123002248/http://www.faurecia.com/en/innovation/discover-our-innovations/smart-pebbles [retrieved on Nov. 23, 2017].
Ferwerda et al., "Perception of sparkle in anti-glare display screens", Journal of the SID, vol. 22, Issue 2, 2014, pp. 129-136.
Galuppi et al; "Buckling Phenomena in Double Curved Cold-Bent Glass;" Intl. J. Non-Linear Mechanics 64 (2014) pp. 70-84.
Galuppi et al; "Large Deformations and Snap-Through Instability of Cold-Bent Glass" Challenging Glass 4 & Cost Action TU0905 Final Conference; (2014) pp. 681-689.
Galuppi L et al: "Optimal cold bending of laminated glass", Jan. 1, 2007 vol. 52, No. 1/2 Jan. 1, 2007 (Jan. 1, 2007), pp. 123-146.
Gollier et al., "Display Sparkle Measurement and Human Response", SID Symposium Digest of Technical Papers, vol. 44, Issue 1, 2013, pp. 295-297.
Indian Patent Application No. 201917031293 Office Action dated May 24, 2021; 6 pages; Indian Patent Office.
Jalopnik, "This Touch Screen Car Interior is a Realistic Vision of the Near Future", jalopnik.com, Nov. 19, 2014, https://jalopnik.com/this-touch-screen-car-interior-is-a-realistic-vision-of-1660846024 (Year: 2014).
Li et al., "Effective Surface Treatment on the Cover Glass for Autointerior Applications", SID Symposium Digest of Technical Papers, vol. 47, 2016, pp. 467-469.

(56) References Cited

OTHER PUBLICATIONS

Pambianchi et al; "Corning Incorporated: Designing a New Future With Glass and Optics"; Chapter 1 in "Materials Research for Manufacturing: An Industrial Perspective of Turning Materials Into New Products"; Springer Series Material Science 224, p. 12 (2016).
Pegatron Corp. "Pegaton Navigate the Future"; Ecockpit/Center Cnsole Work Premiere; Automotive World; Downloaded Jul. 12, 2017; 2 Pages.
Photodon, "Screen Protectors For Your Car's Navi System That You're Gonna Love", photodon.com, Nov. 6, 2015, https://www.photodon.com/blog/archives/screen-protectors-for-your-cars-navi-system-that-youre-gonna-love) (Year: 2015).
Product Information Sheet: Corning® Gorilla® Glass 3 with Native Damage Resistance™, Corning Incorporated, 2015, Rev: F_090315, 2 pages.
Scholze, H., "Glass-Water Interactions", Journal of Non-Crystalline Solids vol. 102, Issues 1-3, Jun. 1, 1988, pp. 1-10.
Stattler; "New Wave—Curved Glass Shapes Design"; Glass Magazine; (2013); 2 Pages.
Stiles Custom Metal, Inc., Installation Recommendations, 2010 https://stilesdoors.com/techdata/pdf/Installation%20Recommendations%20HM%20Windows,%20Transoms%20&%>OSidelites%200710.pdf) (Year: 2010).
Tomozawa et al., "Hydrogen-to-Alkali Ratio in Hydrated Alkali Aluminosilicate Glass Surfaces", Journal of Non-Crystalline Solids, vol. 358, Issue 24, Dec. 15, 2012, pp. 3546-3550.
Zhixin Wang, Polydimethylsiloxane mechanical properties measured by macroscopic compression and nanoindentation techniques, Graduate Theses and Dissertations, University of South Florida, 2011, 79 pages.
European Patent Application No. 18881263.0, Extended European Search Report dated Jul. 5, 2021; 8 pages; European Patent Office.
International Search Report and Written Opinion of the International Searching Authority; PCT/KR2018/014388; dated Mar. 20, 2019; 20 Pages; Korean Intellectual Property Office.
Japanese Patent Application No. 2020-527882, Office Action, dated Aug. 10, 2022, 8 pages (4 pages of English Translation and 4 pages of Original Copy); Japanese Patent Office.
Author Unknown; "Stress Optics Laboratory Practice Guide" 2012; 11 Pages.
Belis et al; "Cold Bending of Laminated Glass Panels"; Heron vol. 52 (2007) No. 1/2; 24 Pages.
Doyle et al; "Manual on Experimental Stress Analysis; Fifth Edition, Society for Experimental Mechanics; Unknown Year; 31 Pages".
Elziere; "Laminated Glass: Dynamic Rupture of Adhesion"; Polymers; Universite Pierre Et Marie Curie—Paris VI, 2016. English; 181 Pages.
Fildhuth et al; "Considerations Using Curved, Heat or Cold Bent Glass for Assembling Full Glass Shells", Engineered Transparency, International Conference at Glasstec, Dusseldorf, Germany, Oct. 25 and 26, 2012; 11 Pages.
Fildhuth et al; "Interior Stress Monitoring of Laminated Cold Bent Glass With Fibre Bragg Sensors", Challenging Glass 4 & Cost Action TU0905 Final Conference Louter, Bos & Belis (Eds), 2014; 8 Pages.
Fildhuth et al; "Layout Strategies and Optimisation of Joint Patterns in Full Glass Shells", Challenging Glass 3—Conference on Architectural and Structural Applications of Glass, Bos, Louter, Nijsse, Veer (Eds.), Tu Delft, Jun. 2012; 13 Pages.
Fildhuth et al; "Recovery Behaviour of Laminated Cold Bent Glass—Numerical Analysis and Testing"; Challenging Glass 4 & Cost Action TU0905 Final Conference—Louter, Bos & Beus (Eds) (2014); 9 Pages.
Fildhuth; "Design and Monitoring of Cold Bent Lamination—Stabilised Glass"; Itke 39 (2015) 270 Pages.
Galuppi et al; "Cold-Lamination-Bending of Glass: Sinusoidal is Better Than Circular", Composites Part B 79 (2015) 285-300.
Galuppi et al; "Optical Cold Bending of Laminated Glass"; Internaitonal Journal of Solids and Structures, 67-68 (2015) pp. 231-243.
Millard; "Bending Glass in the Parametric Age"; Enclos; (2015); pp. 1-6; http://www.enclos.com/site-info/news/bending-glass-in-the-parametric-age.
Neugebauer et al; "Let Thin Glass in the Faade Move Thin Glass—New Possibilities for Glass in the Faade", Conference Paper Jun. 2018; 12 Pages.
Vakar et al; "Cold Bendable, Laminated Glass—New Possibilities in Design"; Structural Engineering International, Feb. 2004 pp. 95-97.
Weijde; "Graduation Plan"; Jan. 2017; 30 Pages.
Werner; "Display Materials and Processes," Information Display; May 2015; 8 Pages.

\* cited by examiner

[Fig. 1]
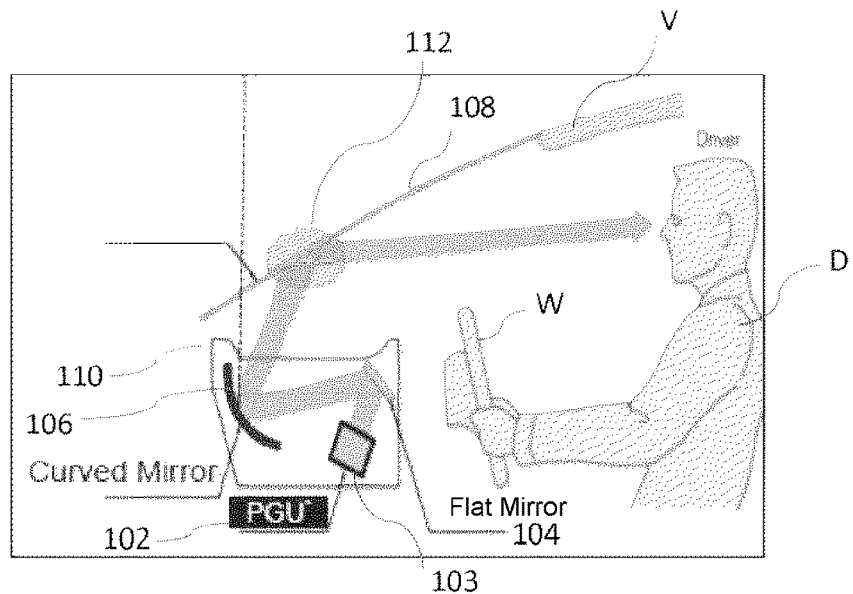
[Fig. 2]
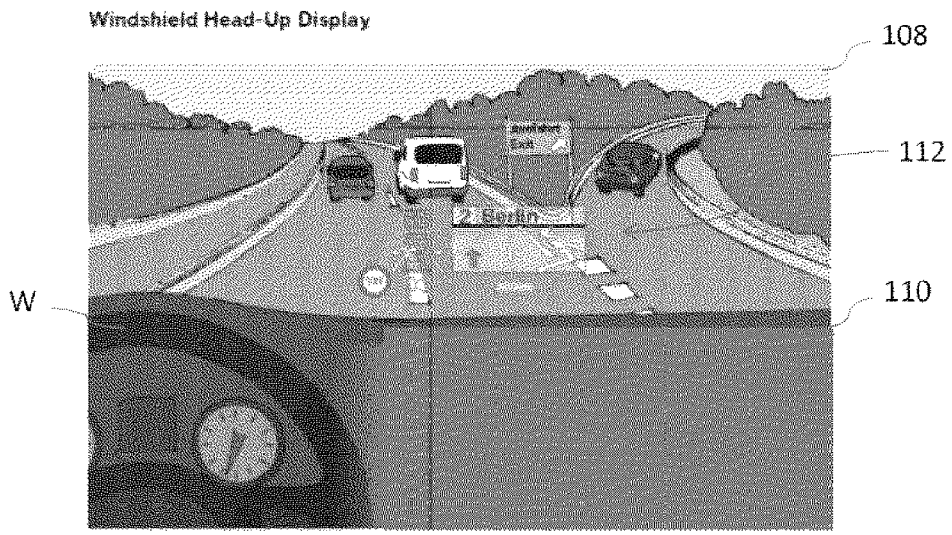
[Fig. 3]
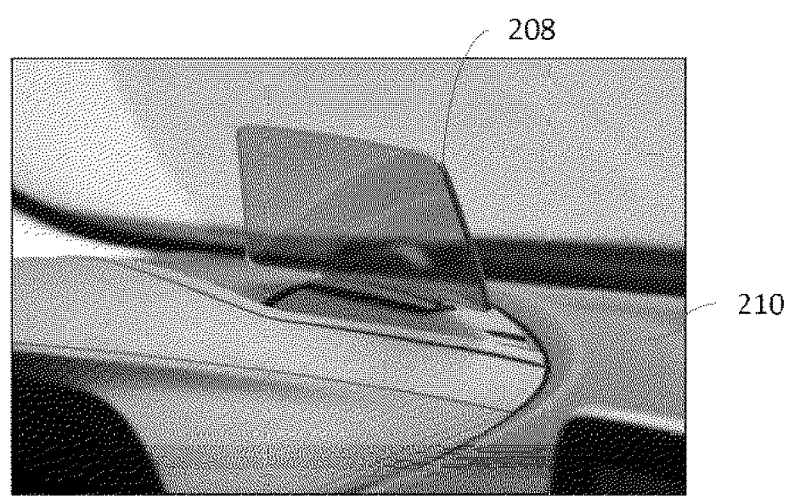

[Fig. 4]
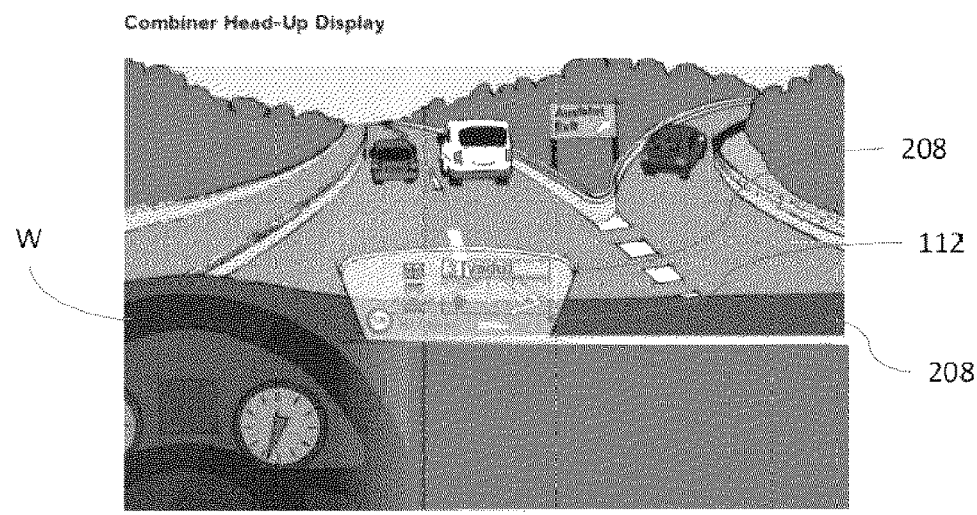
[Fig. 5]
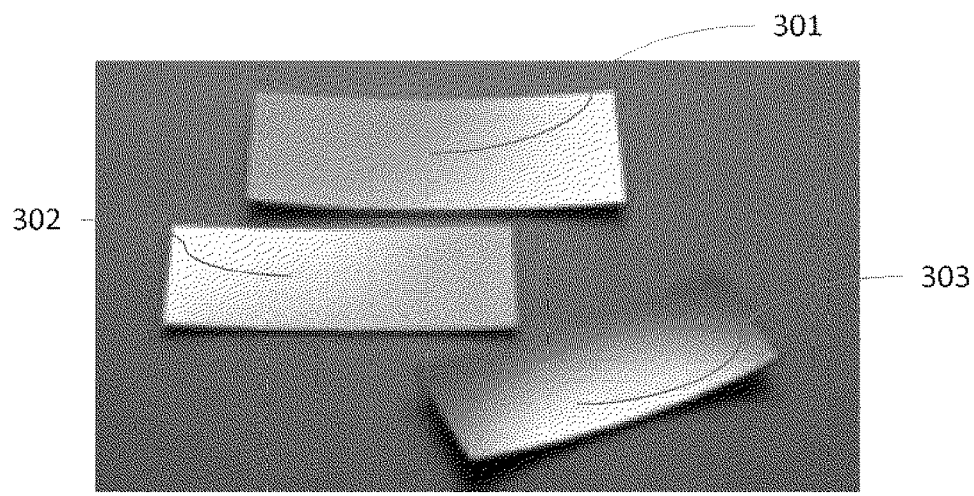
[Fig. 6]
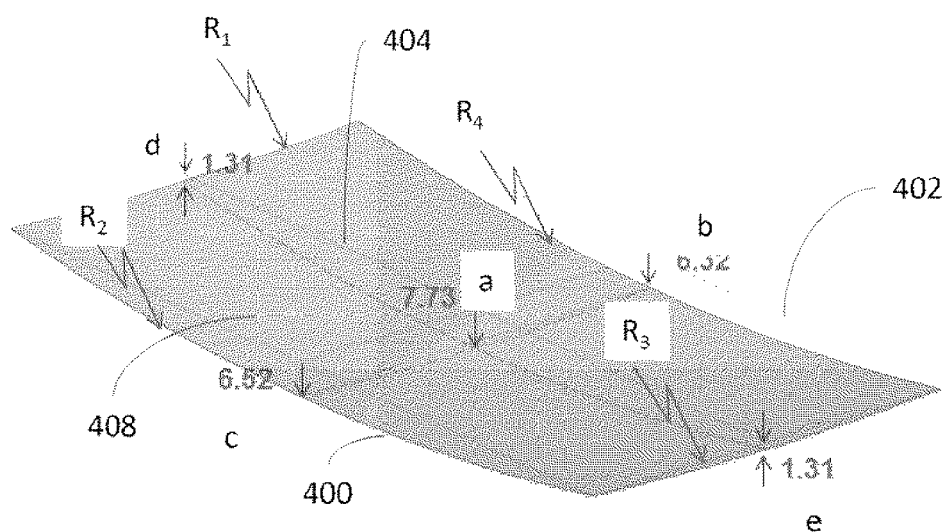
$Ra \neq Rb \neq Rc \neq Rd$

[Fig. 7A]
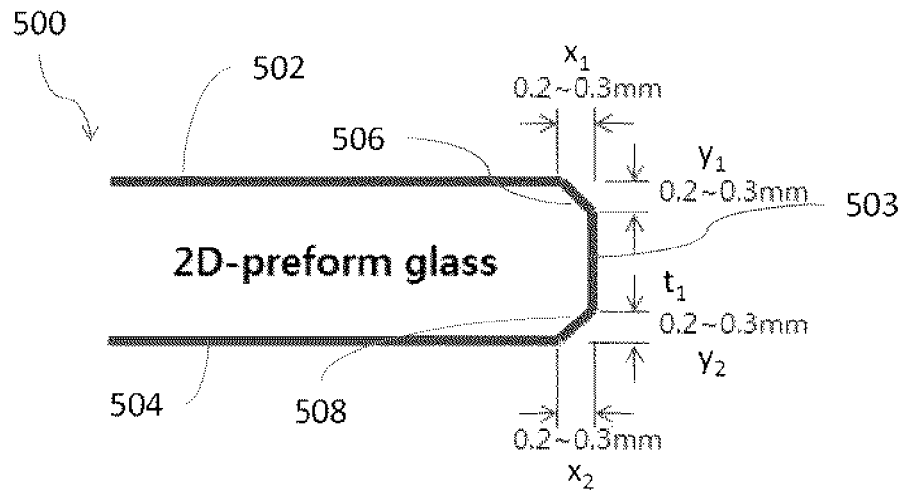
[Fig. 7B]
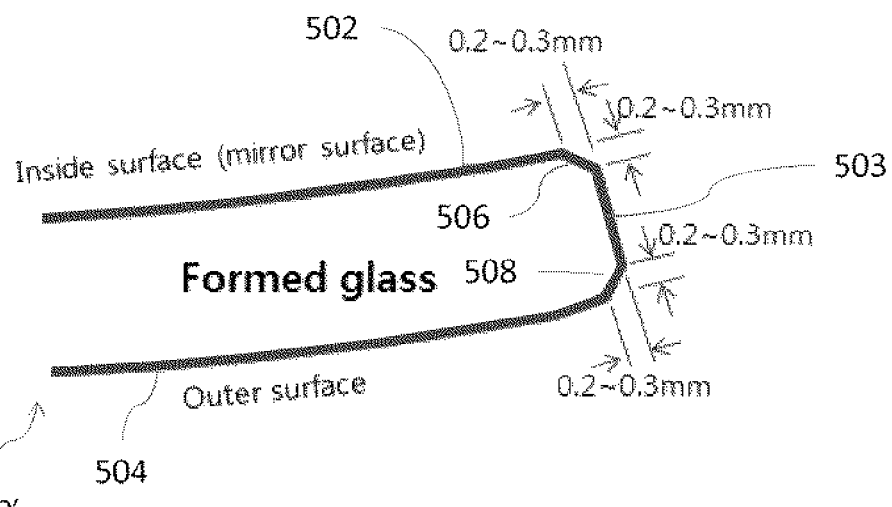
[Fig. 8A]
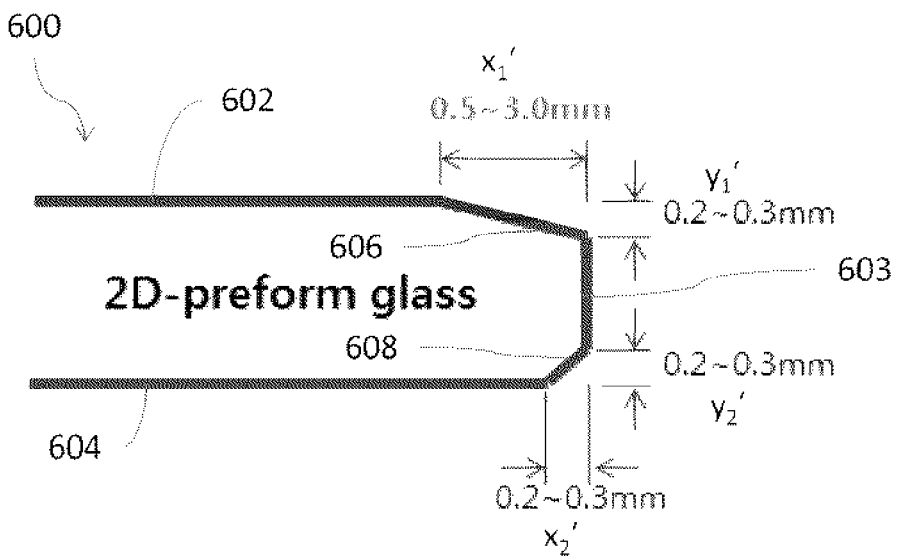

[Fig. 8B]
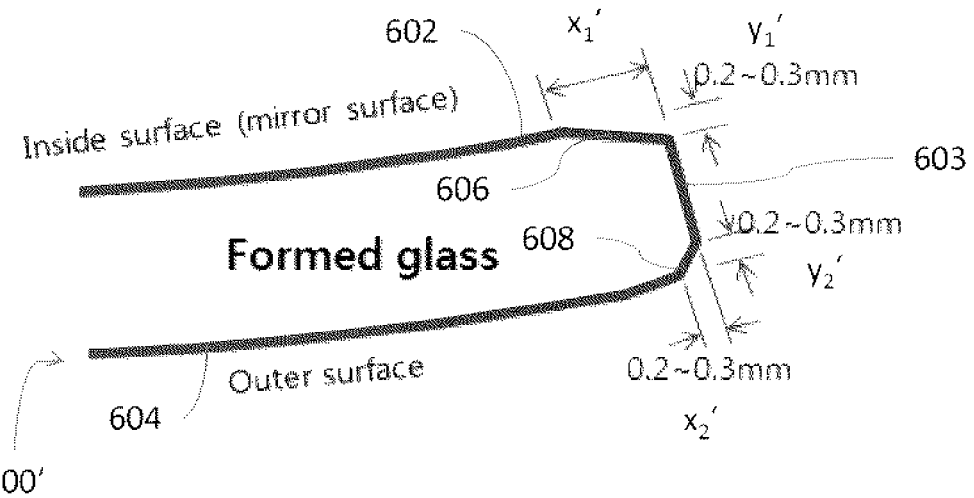
[Fig. 9]
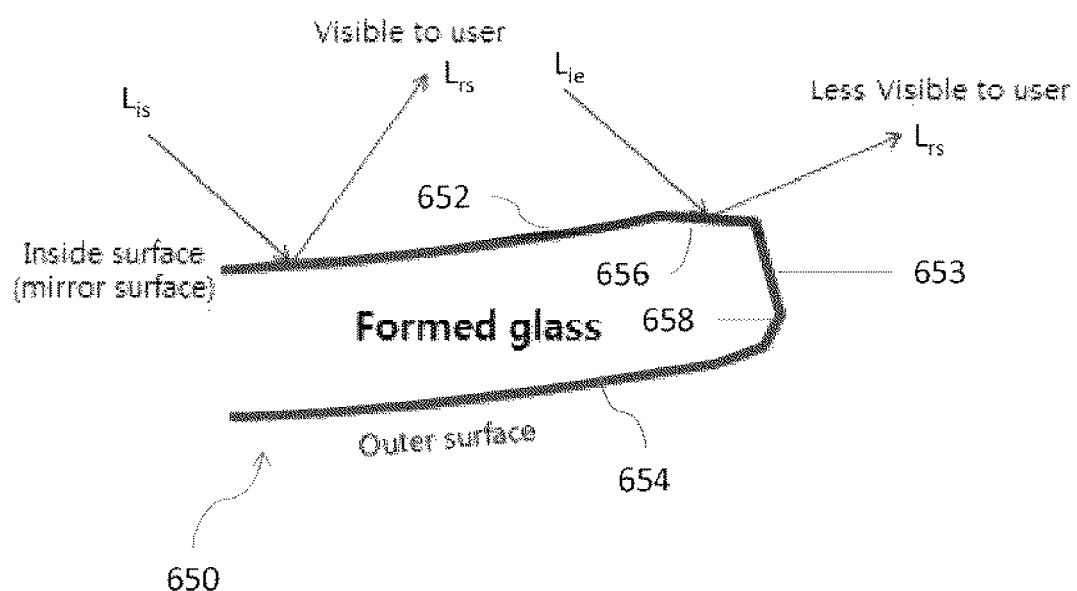

[Fig. 11A]
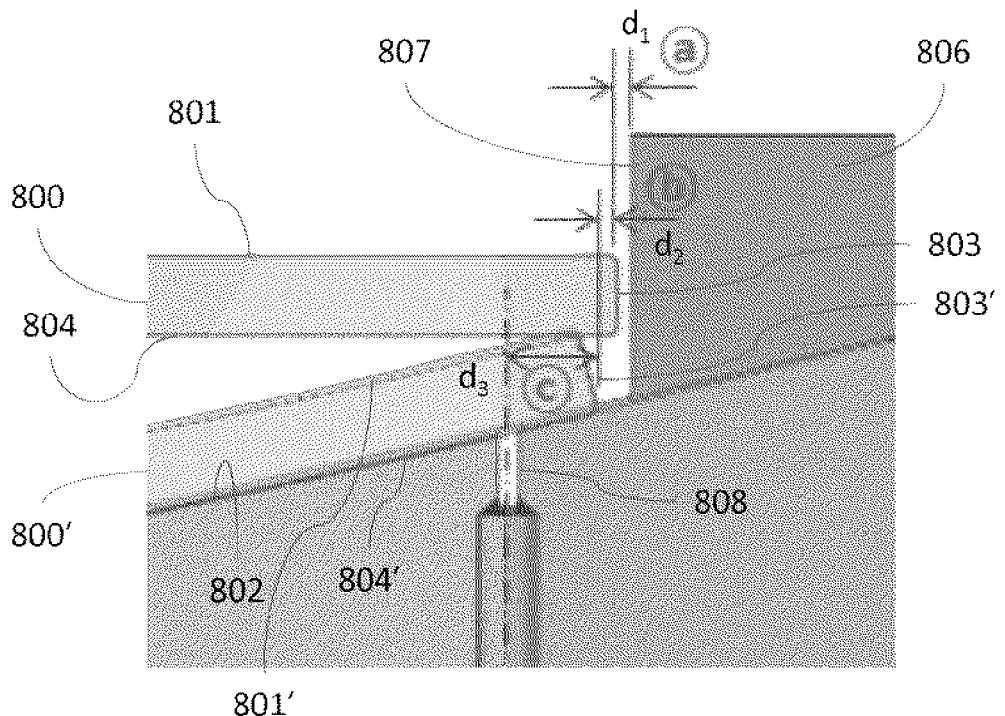
[Fig. 11B]
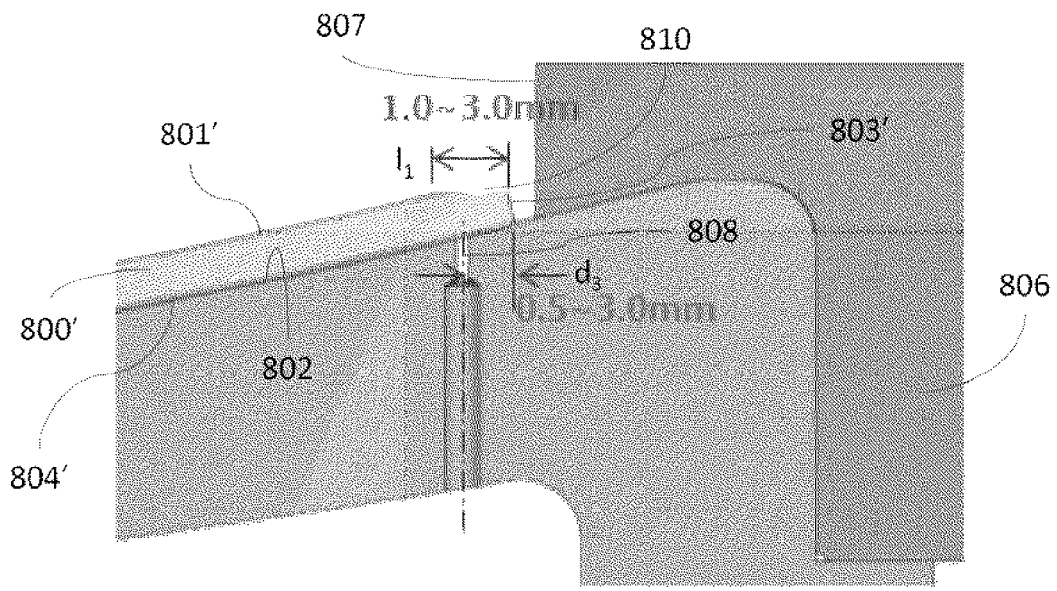

[Fig. 13]
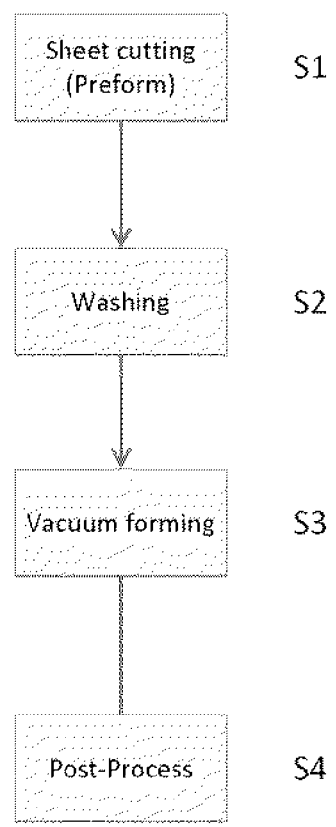

ASPHERIC MIRROR FOR HEAD-UP DISPLAY SYSTEM AND METHODS FOR FORMING THE SAME

TECHNICAL FIELD

CROSS-REFERENCE TO RELATED APPLICATIONS

This application is a 371 of PCT Application No.: PCT/KR2018/014388 filed on Nov. 21, 2018, which claims the benefit of priority under 35 U.S.C. § 119 of U.S. Provisional Application Serial No. 62/589,172 filed on Nov. 21, 2017, the content of which is relied upon and incorporated herein by reference in its entirety.

BACKGROUND ART

Head-Up Display or Heads-Up Display (HUD) systems project visual information onto a transparent surface so that users can see the information without diverting their gaze away from their primary view. HUD systems typically use a mirror to reflect and project an image onto the transparent surface. One application for HUD systems is in transportation, such as automobiles, aircraft, marine craft, and other vehicles. For example, HUD systems can be deployed in vehicles so that an operator or driver of the vehicle can see information relevant to the operation of the vehicle while maintaining a forward gaze and without having to look down or away towards a display screen. Thus, HUD systems are believed to improve safety by minimizing the need for a vehicle operator to look away from a safe operating viewpoint.

However, HUD systems have often suffered from poor optical quality in the projected image, which may result in an undesirable aesthetic quality to the projected image. Poor optical quality may even decrease the safety of HUD systems, because blurry or unclear projected images can make it more difficult for users to read or understand the projected information, resulting in increased user processing time of the information, delayed user reaction time based on the information, and increased user distraction. Reduced optical quality can result from the mirror used in the HUD system.

DISCLOSURE OF INVENTION

Technical Problem

Thus, there remains a need for HUD systems, and particularly improved mirrors for HUD systems, that have improved optical quality.

Solution to Problem

In some embodiments of the present disclosure, a glass-based preform for a mirror of a heads-up display (HUD) system is provided. The glass-based preform comprises a glass-based substrate having a first major surface, a second major surface opposite to the first major surface, and a minor surface connecting the first and second major surfaces. In addition, the preform includes a first chamfer at an edge of the first major surface, the first chamfer having a first end at an intersection of the first chamfer and the first major surface and having a second end at an intersection of the first chamfer and the minor surface, and can also include a second chamfer at an edge of the second major surface, the second chamfer having a first end at an intersection of the second chamfer and the second major surface and having a second end at an intersection of the second chamfer and the minor surface. The first chamfer has a different size or shape from the second chamfer.

In additional embodiments, a mirror for a HUD system is provided, comprising the glass-based preform with a glass-based substrate having a first major surface, a second major surface opposite to the first major surface, and a minor surface connecting the first and second major surfaces. In addition, the preform includes a first chamfer at an edge of the first major surface, the first chamfer having a first end at an intersection of the first chamfer and the first major surface and having a second end at an intersection of the first chamfer and the minor surface, and can also include a second chamfer at an edge of the second major surface, the second chamfer having a first end at an intersection of the second chamfer and the second major surface and having a second end at an intersection of the second chamfer and the minor surface. The first chamfer has a different size or shape from the second chamfer. The mirror further comprises a reflective layer on the first major surface of the glass-based preform. The glass-based substrate has a first radius of curvature such that the first major surface has a concave shape and the second major surface has a convex shape, the first radius of curvature being measured with respect to a first axis of curvature. The glass-based substrate can have a second radius of curvature measured with respect to a second axis of curvature different from the first axis of curvature, where the first axis of curvature is perpendicular to the second axis of curvature. In some embodiments, the first major surface has an aspheric shape.

In further embodiments, a method of forming a three-dimensional mirror is provided, the method comprising providing a glass-based mirror preform including a first major surface having an edge with a first chamfer, a second major surface opposite to the first major surface and having an edge with a second chamfer, and a minor surface connecting the first and second major surfaces, the second chamfer having a different size or shape than the first chamfer. The method also includes disposing the glass-based preform on a molding apparatus having a curved support surface with the second major surface facing the curved support surface, and conforming the glass-based preform to the curved support surface to form a curved mirror substrate having a first radius of curvature.

In another embodiment, a heads-up display (HUD) projection system is provided. The HUD system comprises a display unit configured to display an image to be viewed by a user of a HUD system; and a mirror configured to reflect the image to a viewing area viewable by the user. The mirror comprises a glass-based substrate having a first major surface that is reflective, a second major surface opposite to the first major surface, and a minor surface connecting the first and second major surfaces, a first chamfer at an edge of the first major surface, the first chamfer having a first end at an intersection of the first chamfer and the first major surface and having a second end at an intersection of the first chamfer and the minor surface, and a second chamfer at an edge of the second major surface, the second chamfer having a first end at an intersection of the second chamfer and the second major surface and having a second end at an intersection of the second chamfer and the minor surface. The first chamfer has a different size or shape from the second chamfer.

In another embodiment, a method of forming a three-dimensional mirror is provided. The method includes providing a glass-based mirror preform having a first major surface, a second major surface opposite to the first major surface, and a minor surface connecting the first and second major surfaces, the glass preform having a flat shape; forming a first chamfer at an edge of the first major surface; forming a second chamfer at an edge of the second major surface, the second chamfer having a different size or shape from the first chamfer; disposing the glass-based preform on a molding apparatus having a curved support surface with the second major surface facing the curved support surface; and conforming the glass-based preform to the curved support surface to form a curved mirror substrate having a first radius of curvature. The conforming of the glass-based preform to the curved support surface is performed at a temperature that is less than a glass transition temperature of the glass-based preform, and a temperature of the glass-based substrate may not be raised above the glass transition temperature of the glass-based substrate during or after the conforming.

In another embodiment, a heads-up display (HUD) system is provided, comprising a projection surface for viewing a projected image by a user of the HUD system; a display unit configured to produce an image to be viewed by the user on the projection surface; and a mirror configured to reflect the image to the projection surface to form the projected image. The mirror includes a glass-based substrate having a first major surface that is reflective, a second major surface opposite to the first major surface, and a minor surface connecting the first and second major surfaces; a first chamfer at an edge of the first major surface, the first chamfer; and a second chamfer at an edge of the second major surface, wherein the first chamfer has a different size or shape from the second chamfer.

In another embodiment, a heads-up display (HUD) projection system is provided, comprising a display unit configured to display an image to be viewed by a user of a HUD system; and a mirror configured to reflect the image to a viewing area viewable by the user. The mirror includes a glass-based substrate having a first major surface that is reflective, a second major surface opposite to the first major surface, and a minor surface connecting the first and second major surfaces, and a chamfer at an edge of the first major surface, the chamfer having a first length.

Additional features and advantages of the claimed subject matter will be set forth in the detailed description which follows, and in part will be readily apparent to those skilled in the art from that description or recognized by practicing the claimed subject matter as described herein, including the detailed description which follows, the claims, as well as the appended drawings.

It is to be understood that both the foregoing general description and the following detailed description present embodiments of the present disclosure, and are intended to provide an overview or framework for understanding the nature and character of the claimed subject matter. The accompanying drawings are included to provide a further understanding of the present disclosure, and are incorporated into and constitute a part of this specification. The drawings illustrate various embodiments and together with the description serve to explain the principles and operations of the claimed subject matter.

BRIEF DESCRIPTION OF DRAWINGS

For the purposes of illustration, there are forms shown in the drawings that are presently preferred, it being understood, however, that the embodiments disclosed and discussed herein are not limited to the precise arrangements and instrumentalities shown.

FIG. 1 is an illustration of HUD system in a vehicle according to some embodiments of the present disclosure.

FIG. 2 is a pictorial depiction of an automobile driver's viewpoint when using the HUD system of FIG. 1, according to some embodiments.

FIG. 3 is a photographic of an example of a combiner used in HUD systems according to some embodiments of the present disclosure.

FIG. 4 is a pictorial depiction of an automobile driver's viewpoint when using a HUD system with a combiner similar to the one shown in FIG. 3, according to some embodiments.

FIG. 5 is a photograph of three example mirrors for HUD systems according to some embodiments.

FIG. 6 is an illustration of an aspheric mirror for a HUD system according to some embodiments.

FIGS. 7A and 7B are schematic representations of a symmetrical edge of a 2D-preform substrate and a 3D-formed substrate, respectively, for a HUD system.

FIGS. 8A and 8B are schematic representations of an asymmetrical edge of a 2D-preform substrate and a 3D-formed substrate, respectively, for a HUD system according to some embodiments of the present disclosure.

FIG. 9 is a schematic of an asymmetrical edge of a 3D-formed substrate for a HUD system according to some embodiments.

FIGS. 11A and 11B are cross-section views of an edge of a substrate on the vacuum-based forming surface of FIG. 10.

FIG. 13 shows steps in a method of forming a mirror or mirror substrate according to some embodiments of the present disclosure.

BEST MODE FOR CARRYING OUT THE INVENTION

Figure 10:
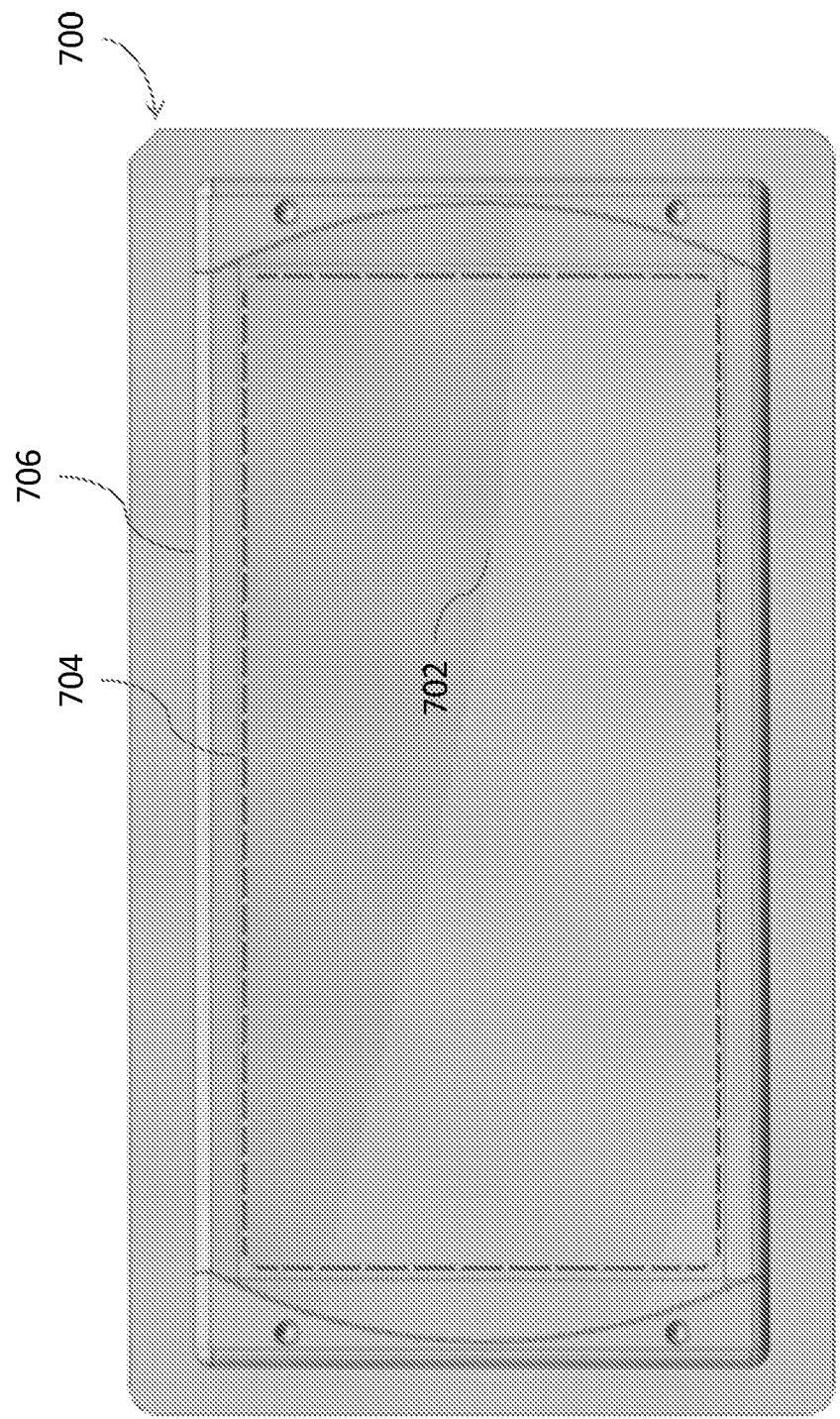
FIG. 10 is a pictorial depiction of a vacuum-based forming surface according to some embodiments of the present disclosure.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other.

Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range. As used herein, the indefinite articles "a," and "an," and the corresponding definite article "the" mean "at least one" or "one or more," unless otherwise specified.

The following description of the present disclosure is provided as an enabling teaching thereof and its best, currently-known embodiment. Those skilled in the art will recognize that many changes can be made to the embodiment described herein while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations of the present disclosure are possible and may even be desirable in certain circumstances and are part of the present disclosure. Thus, the following description is provided as illustrative of the principles of the present disclosure and not in limitation thereof.

Those skilled in the art will appreciate that many modifications to the exemplary embodiments described herein are possible without departing from the spirit and scope of the present disclosure. Thus, the description is not intended and should not be construed to be limited to the examples given but should be granted the full breadth of protection afforded by the appended claims and equivalents thereto. In addition, it is possible to use some of the features of the present disclosure without the corresponding use of other features. Accordingly, the following description of exemplary or illustrative embodiments is provided for the purpose of illustrating the principles of the present disclosure and not in limitation thereof and may include modification thereto and permutations thereof.

HUD systems can be used to provide a wide variety of types of information for improved safety and convenience of users. In transportation, for example, information relevant to vehicle operation, such as vehicle gauges or navigation, can be projected to an area in front of a driver. This can include real-time information on vehicle speed, fuel level, climate control settings, entertainment settings, turn-by-turn navigation indicators, estimated time of arrival, and alerts related to speed, traffic, or dangerous conditions. Information can be presented as text, symbols, pictures, videos, animation, and one or more colors. These are examples only, and embodiments of this disclosure are not intended to be limited to these examples.

In some embodiments of the present disclosure, a HUD system can include an image generating device and one or more optical components for directing or projecting an image from the image generating device to an area that is easily visible to a user. The image generating device can include a cathode ray tube (CRT) display, a light-emitting diode (LED) display, a liquid crystal display (LCD) assembly, laser projection system, or other type of display known by those of ordinary skill in the art. The HUD system may also include a computer or processor for generating the images produced by these displays. The optical components may include some combination of lenses, beam splitters, mirrors, and combiner, for example. The combination of components of a HUD system can be configured to produce collimated light.

The collimated light is projected onto a combiner that is in a field of view of a user so that the user can see the projected image and the normal field of view simultaneously. For example, in vehicular applications, the combiner can be a windshield. Alternatively, the combiner can be a separate component that is built into the vehicle, or a portable component that can be mounted in the vehicle in a location where a driver or passenger can see the projected image on a transparent surface of the combiner. The mirror can include a reflective coating on a curved substrate. The curved substrate may be spherical, aspherical, a Fresnel shape, and/or diffractive. In one preferred embodiment, the mirror has a reflective surface or coating on a concave, aspherical surface.

FIG. 1 shows an example of a HUD system 100 according to some embodiments of the present disclosure. The HUD system 100 is shown in an automobile, but embodiments can be used in various vehicles or non-vehicular applications. A driver D is shown with hands the steering wheel W of the vehicle V. The HUD system 100 is incorporated into the dash 110 of the vehicle V, and includes a programmable graphical unit (PGU) 102 connected to an image source 103 configured to produce an image based on a signal from the PGU 102. That image is reflected by a flat mirror 104 towards a curved mirror 106. From the curved mirror 106, the image is projected toward the windshield 108 and onto a projection area 112 of the windshield 108. The HUD system 100 can be configured so that the projection area 112 is within the normal line of sight of the driver D while driving the vehicle V. For example, the projection area 112 can be positioned so that the projected image is overlaid on the road as seen from the driver's perspective. An example of this scenario is shown in the illustration of FIG. 2.

While the projection area 112 is located on the windshield 108 in FIGS. 1 and 2, FIGS. 3 and 4 show an alternative embodiment in which a combiner 208 is used for the location of the projection area 212. The combiner 208 can be built into the dash 210 of a vehicle or can be a portable or separable component that is positioned on top of the dash 210.

Embodiments of this disclosure are not limited to one or more particular arrangements of the optical components of a HUD system, as persons of ordinary skill in the art will understand the basic arrangement of components in a HUD system. The present disclosure is directed primarily to the curved mirrors used in HUD systems. FIG. 5 shows examples of curved mirrors 301, 302, and 303 used in HUD systems. The mirrors in HUD system generally have an aspheric reflective surface, which can be a reflective coating formed on an aspheric surface of a mirror substrate. An aspheric or aspherically shaped surface has multiple radii of curvature. In particular, in the case of a four-sided mirror as shown in FIG. 5, for example, an aspheric surface has a different radius of curvature along each of the four edges. Thus, as shown in FIG. 6, a mirror 400 has a reflective surface 408 that is aspherically shaped with a radius of curvature R1 along a first edge, a radius of curvature R2 along a second edge, a radius of curvature R3 along a third edge, and a radius of curvature R4 along a fourth edge. Because the surface 408 is aspherically shaped, R1≠R2≠R3≠R4. FIG. 6 also shows how different points on the curved surface 408 have been displaced by varying amounts a-e with respect to a two-dimensional plane connecting the four corners of the mirror 400. In some embodiments, a≠b≠c≠d.

However, the authors of the present disclosure realized that improvements were needed in the design of and the methods of forming the curved mirrors used in HUD systems. For example, to prevent degradation of image quality as the image is reflected by the curved mirror, the mirror should have a high level of shape accuracy and surface roughness. For example, a shape precision of less than 50 µm and a surface roughness (Ra) of less than 3 nm is desirable. A particular type of optical distortion that occurs in mirrors for HUD systems is referred to as edge distortion, which is optical distortion of light reflected at or near the edge of the mirror. In existing HUD systems, optically impactful imperfections may be introduced into the mirror during manufacturing or shaping of the mirror. The most common methods for forming 3D-shaped mirrors or mirror substrates can be divided into two categories: pressing methods and vacuum-forming methods. Both pressing and vacuum-forming methods, however, can have disadvantages.

In a pressing method, upper and lower molds are used to press the substrate, such as a glass substrate, by physical force. For example, the upper mold may be pressed into a lower mold with a 2D glass preform disposed between the two molds, and the glass preform is formed according to the shape of a surface on one or both of the molds. As a result, mold imprints may be left on both the concave and convex surfaces of the formed glass substrate, which then requires polishing. In addition, due to deviations in the contours of the upper and lower molds, it can be difficult to precisely match the contours of the upper and lower molds, and thus difficult to achieve a precise shape for the formed glass substrate. For example, the specification for aspheric mirror contours can be less than ±25 μm, while the mold contour deviation after machining is normally 30-50 μm.

In a vacuum forming method, a single mold (e.g., lower mold) can be used, where vacuum holes are formed in the surface of the mold. A flat (2D) glass sheet is disposed on the surface of the mold and vacuum pressure is supplied via the vacuum holes to conform the glass to the curved (3D) surface of the mold. However, it is difficult to avoid the formation of vacuum hole marks on the surface of the formed glass substrate. These vacuum hole marks or manufacturing artifacts can impair the optical performance of the substrate or the finished mirror. In addition, typical vacuum forming methods can require higher forming temperatures compared to pressing methods. Higher forming temperatures can affect surface quality and form defects such as dimples, pits, and imprints. Vacuum forming can be performed on a mirror preform, which is a substrate that is pre-cut to the desired size before forming into a 3D shape with vacuum forming, or on an oversized sheet of glass, which is cut to the desired size after forming into a 3D shape with vacuum forming. Both preform-based and oversized-glass-based vacuum forming have certain advantages and disadvantages.

Oversized-glass-based forming, for example, has advantages of achieving good edge quality due to edge cutting, and good surface roughness due to lower forming temperatures. However, oversized-glass-based forming requires the added steps of cutting the glass after forming; has low glass utilization due to trim glass or waste glass after forming; requires edge polishing and/or chamfering after cutting; and requires larger equipment even though the eventual finished product may be the same size as that formed in preform-based forming.

On the other hand, in preform-based vacuum forming, there is no need to cut the mirror substrate after vacuum forming, which reduces the production of waste or cullet glass. In addition, preform-based forming can be a more simple process and more cost effective. However, in a preform-based vacuum forming method, it is difficult or impossible to apply a relatively uniform vacuum pressure over the entire surface of the glass sheet due to vacuum leaks at one or more edges of the glass preform, due at least in part to vacuum leakage between the preform and the mold. For example, if the formed glass is to have a single radius of curvature, the short-side edge of the preform may maintain contact with the mold surface until forming is complete, but the vacuum will leak along the long-side edge of the preform. In the case of more complex curvature or an aspheric mold surface (and aspheric formed substrate), only discrete points of the glass sheet, such as the four corners, may contact the mold surface throughout forming, which results in vacuum leakage along all edges of the glass substrate. Also, for forming an aspheric mirror, it is possible for the corner of the mirror or mirror substrate to chip or break, which occurs when only the corners of the mirror substrate are in contact with the mold and an external force (e.g., vacuum pressure, mold pressing force) is applied, thus concentrating pressure at the four corners of the substrate. As such, higher forming temperature (and lower viscosity of the substrate) is used to conform the glass onto the mold surface more completely, and to reduce the stress near the corners to reduce chipping. However, as discussed above, higher temperatures cause surface degradation of the glass substrate and decreased optical performance. Even with higher temperatures, edge distortion of the mirror occurs.

Investigators behind the present disclosure have discovered techniques to improve the mirrors formed using vacuum-based forming methods. In some preferred embodiments, these techniques may be particularly well-suited for the preform-based forming methods. However, some embodiments are not limited to mirrors made using the preform-based forming methods, nor even to vacuum-based methods, generally. One problem addressed by the embodiments of the present disclosure is that of edge distortion. As mentioned above, when using vacuum forming methods, it can be difficult to achieve a uniform vacuum and uniform conformation of the mirror substrate to the mold. It can be particularly difficult to conform the mirror substrate to the desired shape at or near the edges of the substrate, which causes edge distortion and degrades the quality of the image reflected by the mirror near the edge. Therefore, embodiments of the present disclosure provide mirrors and/or mirror substrates with improved optical performance at the edge, and methods of forming the same.

As shown in FIGS. 7A and 7B, a conventional mirror for a HUD system has a symmetrical, chamfered edge. In particular, FIG. 7A shows a 2D preform 500 having a first major surface 502 that is the mirror-side of the preform, a second major surface 504 opposite the first major surface 502, and a minor surface 503 between the first and second major surfaces 502 and 504. The edges of the first and second major surfaces 502 and 504 have a first chamfer 506 and a second chamfer 508, respectively, which are symmetrical. That is, the first chamfer 506 at the edge of the first major surface 502 and the second chamfer 508 at the edge of the second major surface 504 have the same size and/or shape, resulting in a symmetric profile when viewed in cross-section, as shown in FIG. 7A. FIG. 7B shows the resulting three-dimensional (3D) or curved mirror substrate 500' after forming the 2D preform 500 of FIG. 7A.

The geometry of the first and second chamfers 506 and 508 can be described by the x- and y-components of the chamfered surface. As used herein, the x-component refers to a distance measured in a direction parallel to the first or second major surface of a two-dimensional preform. The y-component refers to a distance measured in a direction perpendicular to the first or second major surface of the two-dimensional preform, or parallel to the minor surface of the two-dimensional preform. In FIGS. 7A and 7B, the first chamfer 506 has an x-component $x_1$ and a y-component $y_1$, while the second chamfer 508 has an x-component $x_2$ and a y-component $y_2$. The dimensions of $x_1$, $y_1$, $x_2$, and $y_2$ can range from about 0.2 to about 0.3 mm, for example, where $x_1$ is the same as $x_2$ and $y_1$ is the same as $y_2$. Thus, this conventional form of chamfering can be considered symmetrical chamfering.

However, investigators of the present disclosure found that asymmetrical chamfering of a mirror or mirror preform can reduce edge distortion. In some preferred embodiments, the asymmetrical chamfering takes the form of a larger chamfer on the mirror-side of the mirror or mirror substrate. A "larger" chamfer is a chamfer that has a larger x-component. For example, FIGS. 8A and 8B show a 2D preform 600 and a 3D or curved mirror substrate 600' with asymmetrical chamfers. In particular, FIG. 8A shows a 2D preform 600 having a first major surface 602 that is a mirror-side of the substrate, a second major surface 604 opposite the first major surface 602, and a minor surface 603 between the first and second major surfaces. The edges of the first and second major surfaces 602 and 604 have a first chamfer 606 and a second chamfer 608, respectively, which are asymmetrical. That is, the first chamfer 606 at the edge of the first major surface 602 and the second chamfer 608 at the edge of the second major surface 604 have different sizes and/or shapes, resulting in an asymmetric profile when viewed in cross-section, as shown in FIG. 8A. Due to the chamfers, the minor surface 603 has a decreased thickness $t_2$, which is less than a thickness $t_3$ between the first and second major surfaces 602 and 604 in an un-chamfered section of the substrate 600. In some preferred embodiments, the thickness $t_3$ can be about 1.0 mm to about 3.0 mm; about 2.0 mm; less than about 1.0 mm; or about 0.3 mm to about 1.0 mm. FIG. 8B shows the resulting 3D or curved mirror substrate 600' after forming the 2D preform 600 of FIG. 8A.

Similar to FIGS. 7A and 7B, the geometry of the first and second chamfers 606 and 608 can be described by the x- and y-components of the chamfered surface. In FIGS. 8A and 8B, the first chamfer 606 has an x-component $x_1'$ and a y-component $y_1'$, while the second chamfer 608 has an x-component $x_2'$ and a y-component $y_2'$. However, $x_1'$ and $x_2'$ are not equal, resulting in the asymmetric profile. In particular, the x-component of the mirror-side, $x_1'$, is larger than the x-component on the back or non-mirror side, $x_2'$. In some embodiments, the dimensions of $x_1'$ can be, for example, about 0.5 to about 3.0 mm. If $x_1'$ is too large (e.g., in some embodiments, over 3.0 mm), then the effective area of the mirror can become too small, which is not preferable. The dimensions of $y_1'$, $x_2'$, and $y_2'$ can be, for example, about 0.2 to about 0.3 mm. If the second chamfer 608 on the side of the second major surface 604 is too large (e.g., larger than about 0.2 mm to about 0.3 mm, in some embodiments), the formability is deteriorated and the corner accuracy decreases. However, embodiments are not limited to these dimensions. Thus, this approach results in an asymmetrical profile at the edge of the mirror or mirror substrate.

While chamfers can be measured using the length of the chamfer, or the x- and y-components of the chamfer as discussed above, chamfer geometry can also be described with reference to an angle of inclination of the chamfer surface relative to a surface of the substrate. For example, in FIGS. 8A and 8B, the first chamfer 606 includes an inclined surface with a first end intersecting the first major surface 602 and a second end intersecting the minor surface 603. The inclined surface is at an angle with respect to the first major surface 602. Similarly, the second chamfer 608 includes an inclined surface that is at an angle with respect to the second major surface 604. In some embodiments, the angles of the chamfers can be, for example, about 5 degrees to about 45 degrees. In some embodiments, the angle of the first chamfer 606 can be, for example, about 3 degrees to about 31 degrees; the angle of the second chamfer 608 can be about 33 degrees to about 57 degrees.

The asymmetric chamfering of the substrate edge results in improved formability and alleviates the visibility of distorted images reflected by the edge of the mirror. In the case of edge distortion, the angle of reflection of the display image changes due to the inclination of the chamfered surface, which can prevent the distorted image from being seen by the user. This can result in a projected image with no perceived edge distortion. Edge formability is thought to be improved by thinning of the edge area due to the large chamfer, which makes the edge area more formable. For example, when using identical vacuum pressure, the edge contour deviation relative to the computer-aided design (CAD) model decreases and the contour accuracy increases for an asymmetric edge as compared to a non-asymmetric edge. This improvement in contour accuracy reduces image distortion. In addition, the asymmetric chamfering can help prevent unwanted or dangerous light from entering the glass edge and being directed toward the eyes of a user of the HUD system. Such unwanted light may include sunlight, for example, which can distract drivers or interfere with their vision.

While the embodiments in FIGS. 8A and 8B show both first and second chamfers 606 and 608, some embodiments of the present disclosure can include a chamfer only on the reflective side of the mirror substrate (i.e., the first chamfer 606). Thus, it is possible to achieve the advantages discussed herein of asymmetrical chamfering without having the second chamfer 608, or without a particular design or geometry for the second chamfer. However, it may still be beneficial to have a second chamfer 608 on the back side of the substrate to remove a sharp edge from the edge, and to improve edge formability.

FIG. 9 shows an example of how the above-described improved edge performance is achieved by the asymmetric chamfer. In particular, FIG. 9 shows a cross-section view of an edge area a 3D formed mirror 650 with a first major surface 652 that is reflective and concave. The mirror 650 also has a second major surface 654 opposite the first major surface 652, and a minor surface 653 between the first and second major surfaces 652 and 654. The edge of the mirror 650 has an asymmetric chamfer with a larger chamfer surface 656 on the side of the first major surface 652, and a smaller chamfer surface 658 on the rear side. Incident light L is that is incident on the effective area of the mirror 650 is reflected as $L_{rs}$ toward the user so that the reflected light is visible to the user. However, incident light $L_{ie}$ that is incident on the chamfer surface 656 is reflected as $L_{re}$ in a direction that makes it not visible to the user of the HUD system.

As discussed above, embodiments of this disclosure include forming a curved or 3D mirror substrate using vacuum forming methods. In one aspect, the vacuum forming method uses a mold 700, as shown in FIG. 10. Mold 700 has a forming surface 702 that is shaped to a desired shape of the 3D mirror or mirror substrate. The mold 700 can optionally include a housing 706 surrounding the perimeter of the forming surface 702 and defining a space in which the mirror preform is placed for forming. To conform the mirror substrate (not shown) to the forming surface 702, vacuum pressure is supplied through one or more vacuum holes. However, as discussed above, vacuum holes can leave manufacturing artifacts in the form of imperfections where the substrate contracted the vacuum holes. Thus, mold 700 does not include vacuum holes in an area that will contact the effective area of the mirror substrate. Instead, the mold 700 has a ditch-type vacuum hole 704 at a periphery of the forming surface 702. The ditch-type vacuum hole 704 is positioned to be underneath the larger chamfer of the reflective-surface-side of the mirror when the mirror preform is placed on the mold 700. In addition, the ditch-type vacuum hole 704 is positioned to remain underneath the larger chamfer of the reflective-surface-side of the mirror when the mirror preform during forming of the 3D mirror substrate on the mold 700. Due to the position of the ditch-type vacuum hole 704 relative to the larger chamfer, any imperfection or artifact resulting from the ditch-type vacuum hole 704 will not be apparent to a user of a HUD system because the imperfection will not be located in the effective area of the mirror. As used herein, the effective area is a portion of the mirror or mirror substrate that will reflect the image to be projected and viewed by the user, and is located within the chamfered edge area of the mirror or mirror substrate.

FIGS. 11A and 11B show details view of forming surface 802 near the edge of a mirror preform 800. The resulting formed mirror substrate 800' is also shown in FIGS. 11A and 11B. The preform 800 is placed on the forming surface 802 such that the first major surface 801 (reflective-side of mirror) faces up and away from the forming surface 802, and the second major surface 804 faces the forming surface 802. Thus, with the first major surface 801 facing up, the larger chamfer 810 will also face up and away from the forming surface 802. After forming, the second major surface 804 conforms to the forming surface 802. When the preform 800 is placed in the mold, there is a gap $d_1$ between the minor surface 803 of the preform 800 and the vertical wall 807 of the housing 806 of the mold. The gap $d_1$ is sufficiently large enough to allow for easy placement and removal of the mirror substrate before and after forming. Alternatively, the gap $d_1$ may be non-existent prior to forming. After forming, the minor surface 803 will move to a distance of $d_2$ from the vertical wall 807 due to the curvature of the formed mirror substrate 800', wherein $d_2$ is larger than $d_1$. The mold is designed such that $d_3$ will be smaller than a distance from the vertical wall 807 to the ditch-type vacuum hole 808. In other words, even after forming is completed, the ditch-type vacuum hole 808 will remain covered by the formed mirror substrate 800' so that suction is not lost and the mirror substrate remains in conformity with the forming surface 802. Thus, after forming, there is a non-zero distance $d_3$ between the opening of the ditch-type vacuum hole 808 in the forming surface 802 and the minor surface 803' of the curved mirror substrate 800'. The distance $d_3$ is smaller than a length $l_1$ of the first chamfer 810, where $l_1$ is defined as a straight-light distance from the minor surface 803' of the formed mirror substrate 800' to the intersection of the chamfer with the first major surface 801'. In some embodiments, $l_1$ can be about 1.0 to about 3.0 mm, whereas $d_3$ can be about 0.5 mm to about 3.0 mm. Because $d_3$ is smaller than $l_1$, any ditch-line artifact remaining in the mirror substrate from the ditch-type vacuum hole will be covered by the chamfer on the reflective-surface-side of the formed mirror, so that the defect is not visible to a user.

Figure 12:
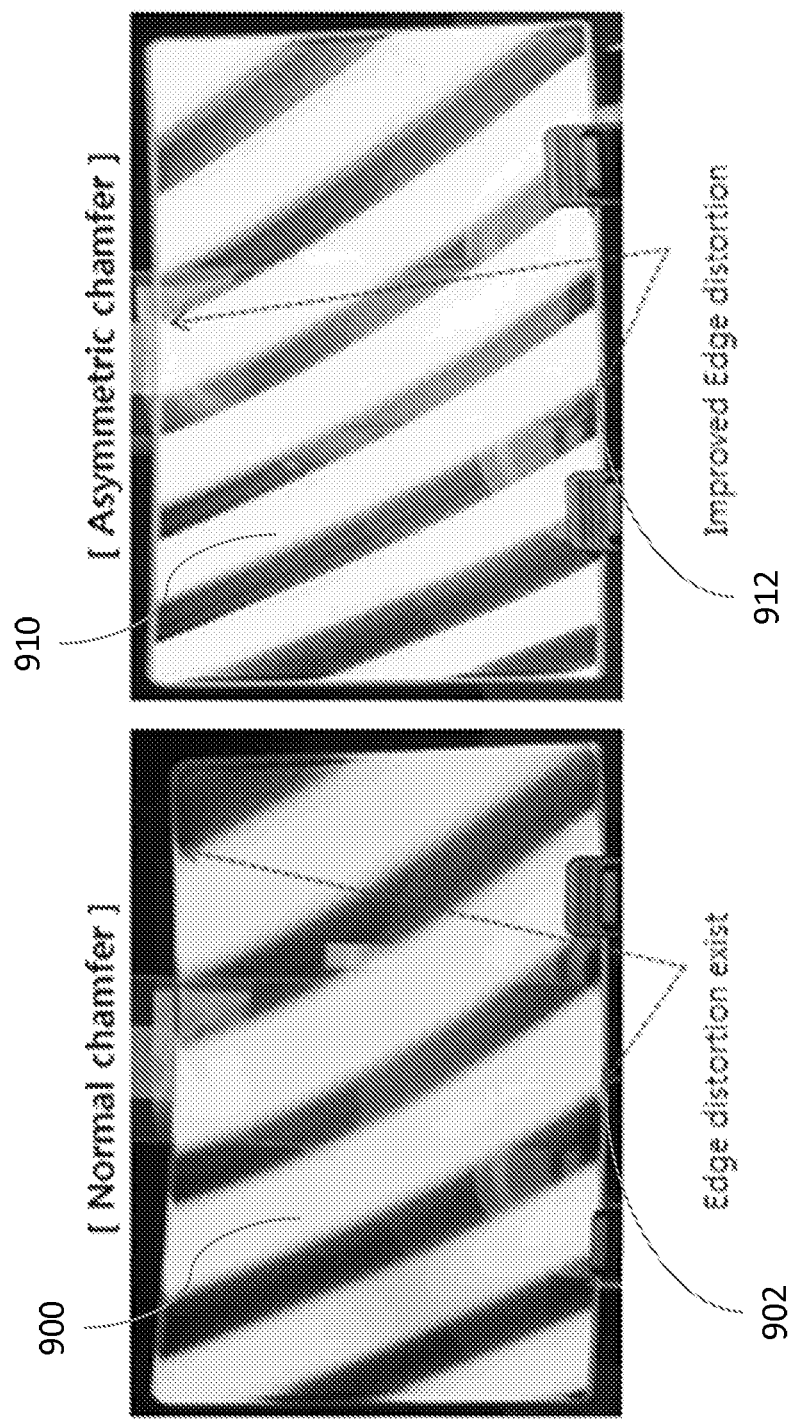
FIG. 12 shows a photographic comparison of the optical quality of a typical mirror substrate for a HUD system to a mirror substrate according to some embodiments of the present disclosure.

FIG. 12 shows a comparison between a 3D mirror substrate 900 using normal chamfering (left) and a 3D mirror substrate 910 using asymmetric chamfering (right). The asymmetric chamfering example shows superior optical performance at the edge 912, without the distortion shown at the edge 902 of the normal chamfering example.

FIG. 13 shows a method of forming a mirror or mirror substrate, according to one or more embodiments of this disclosure. The method includes a step S1 of creating a preform mirror substrate by cutting a sheet of glass to the desired preform shape. After cutting, a washing step S2 may be performed to clean the preform, followed by a step S3 of vacuum forming the preform into a 3D formed substrate. Lastly, one or more post-processing steps S4 can be performed, including edge or surface finishing or coating, or mounting the curved mirror in some part of the HUD system.

The reflective surface can be formed via sputtering, evaporation (e.g., CVD, PVD), plating, or other methods of coating or supplying a reflective surface known to those of ordinary skill in the art. The reflective surface can include one or more metallic/ceramic oxides, metallic/ceramic alloys, for example. The reflective surface is formed on the 3D formed substrate after forming the substrate to a curved or aspheric shape. However, embodiments are not limited to this order, and it is contemplated that a 3D mirror can be formed from a 2D preform having a reflective surface.

In some embodiments, a glass-based preform for a mirror of a heads-up display (HUD) system is provided. The glass-based preform comprises a glass-based substrate having a first major surface, a second major surface opposite to the first major surface, and a minor surface connecting the first and second major surfaces. In addition, the preform includes a first chamfer at an edge of the first major surface, the first chamfer having a first end at an intersection of the first chamfer and the first major surface and having a second end at an intersection of the first chamfer and the minor surface, and can also include a second chamfer at an edge of the second major surface, the second chamfer having a first end at an intersection of the second chamfer and the second major surface and having a second end at an intersection of the second chamfer and the minor surface. The first chamfer has a different size or shape from the second chamfer.

In one aspect, first chamfer has a first length, the second chamfer has a second length, and the first length is different than the second length. The first length can be greater than the second length. The first length is measured in a direction that is in-plane with the first major surface at the intersection with the first chamfer and is measured from the first end of the first chamfer to a plane that is co-planar with the minor surface at the second end of the first chamfer. Similarly, the second length is measured in a direction that is in-plane with the second major surface and is measured from the first end of the second chamfer to a plane that is co-planar with the minor surface at the second end of the second chamfer. In some embodiments, the first length is at least about 1.0 mm; is from about 1.0 mm to about 3.0 mm; or is about 2.0 mm.

The first chamfer can include a first inclined surface at a first angle measured with respect to the first surface, wherein the first inclined surface intersects the first major surface at a first distance of about 0.5 mm to about 3 mm from a minor plane co-planar with the minor surface at the second end of the first chamfer, and intersects the minor surface at a second distance of about 0.2 mm to about 0.3 mm from a first major plane co-planar with the first major surface at the first end of the first chamfer. The second chamfer can include a second inclined surface at a second angle measured with respect to the second surface, wherein the second inclined surface intersects the second major surface at a first distance of about 0.2 mm to about 0.3 mm from a minor plane co-planar with the minor surface at the second end of the second chamfer, and intersects the minor surface at a second distance of about 0.2 mm to about 0.3 mm from a second major plane co-planar with the second major surface at the first end of the first chamfer. The first angle can be about 3 degrees to about 31 degrees, and the second angle can be about 33 degrees to about 57 degrees. In some embodiments, he first angle is from about 5 degrees to about 45 degrees, and the second angle is from about 5 degrees to about 45 degrees.

In another aspect of some embodiments, the first chamfer comprises a first inclined surface at a first angle measured with respect to the first surface, and the second chamfer comprises a second inclined surface at a second angle measured with respect to the second surface, and the first angle is different than the second angle. The first angle is smaller than the second angle. The first inclined surface extends from the first edge to the second edge of the first chamfer, and the second inclined surface extends from the first edge to the second edge of the second chamfer.

In aspects of some embodiments, at least a portion of the first major surface is reflective. The portion of the first major surface that is reflective can have a reflective coating on the glass-based substrate, and the reflective coating can include a metal, a metal oxide, a ceramic oxide, or a metal-ceramic alloy. In some aspects, the reflective coating comprises aluminum or silver.

A length of the first inclined surface as measured in a direction parallel to the first major surface can be about 0.5 mm to 3 mm, and a length of the first inclined surface as measured in a direction parallel to the minor surface can be about 0.2 mm to 0.3 mm. A length of the second inclined surface as measured in a direction parallel to the second major surface can be about 0.2 mm to 0.3 mm, and a length of the second inclined surface as measured in a direction parallel to the minor surface can be about 0.2 mm to 0.3 mm. As an aspect of some embodiments, the glass-based substrate has a thickness that is less than or equal to 3.0 mm; from about 0.5 mm to about 3.0 mm; from about 0.5 mm to about 1.0 mm; or from about 1.0 mm to about 3.0 mm.

In another embodiment, a mirror for a HUD system is provided, comprising the glass-based preform of any one of the above embodiments. The mirror further comprises a reflective layer on the first major surface of the glass-based preform. The glass-based substrate has a first radius of curvature such that the first major surface has a concave shape and the second major surface has a convex shape, the first radius of curvature being measured with respect to a first axis of curvature. The glass-based substrate can have a second radius of curvature measured with respect to a second axis of curvature different from the first axis of curvature, where the first axis of curvature is perpendicular to the second axis of curvature. In some embodiments, the first major surface has an aspheric shape.

In another embodiment, a method of forming a three-dimensional mirror is provided, the method comprising providing a glass-based mirror preform including a first major surface having an edge with a first chamfer, a second major surface opposite to the first major surface and having an edge with a second chamfer, and a minor surface connecting the first and second major surfaces, the second chamfer having a different size or shape than the first chamfer. The method also includes disposing the glass-based preform on a molding apparatus having a curved support surface with the second major surface facing the curved support surface, and conforming the glass-based preform to the curved support surface to form a curved mirror substrate having a first radius of curvature.

In aspects of some of the embodiments, the conforming of the glass-based preform to the curved support surface is performed at a temperature that is less than a glass transition temperature of the glass-based preform. A temperature of the glass-based substrate may not be raised above the glass transition temperature of the glass-based substrate during or after the conforming.

In additional aspects of some of the embodiments, the curved support surface has a concave shape, and the concave shape can be an aspheric shape. The curved support surface can also comprise a vacuum chuck with at least one opening in the curved support surface. The method can further include supplying a vacuum to the at least one opening to conform the curved glass blank to the curved support surface. The at least one opening can be a ditch-type vacuum hole.

The first chamfer is formed in the first major surface such that the first chamfer begins in the first major surface at a first distance from the minor surface, wherein, when the glass-based preform is disposed on the curved support surface, the at least one opening is a second distance from the minor surface, and wherein the first distance is greater than or equal to the second distance. The molding apparatus can include a raised perimeter surface or wall adjacent the curved support surface and defining a space on the curved support surface in which the glass-based preform is to be disposed. The first chamfer is formed in the first major surface such the first chamfer begins in the first major surface at a first distance from the minor surface, wherein the at least one opening is a second distance from the raised perimeter surface or wall, and the first distance is greater than or equal to the second distance; or the first distance is greater than the second distance.

The method can further include forming a reflective layer on the first major surface. The reflective layer can be formed by sputtering, plating, or vapor deposition of a material of the reflective layer onto the first major surface. The reflective layer comprises a metal, a metal oxide, a ceramic oxide, or a metal-ceramic alloy; and can include aluminum or silver. The reflective layer is formed on the first major surface after forming the curved mirror substrate to form an aspheric mirror.

As an aspect of some embodiments, the first chamfer comprises a first inclined surface at a first angle measured with respect to the first surface, the first inclined surface having a first length, wherein the second chamfer comprises a second inclined surface at a second angle measured with respect to the second surface, the second inclined surface having a second length, and wherein the first length is different than the second length, or can be greater than the second length. The first length is measured in a direction that is in-plane with the first major surface and is measured from an intersection of the first inclined surface and the first major surface to a plane that is co-planar with the minor surface, and the second length is measured in a direction that is in-plane with the second major surface and is measured from an intersection of the second inclined surface and the second major surface to a plane that is co-planar with the minor surface. The first length can be at least about 1.0 mm; from about 1.0 mm to about 3.0 mm; or about 2.0 mm. The first inclined surface intersects the first major surface at about 0.5 mm to about 3 mm from a first plane co-planar with the minor surface, and intersects the minor surface at about 0.2 mm to about 0.3 mm from a second plane co-planar with the first major surface. The second inclined surface intersects the second major surface at about 0.2 mm to about 0.3 mm from a plane co-planar with the minor surface, and intersects the minor surface at about 0.2 mm to about 0.3 mm from a plane co-planar with the second major surface.

In another aspect of some of the embodiments of the method, the first chamfer defines a first inclined surface at a first angle measured with respect to the first surface, and the second chamfer defines a second inclined surface at a second angle measured with respect to the second surface, and the first angle is different than the second angle. The first angle can be smaller than the second angle.

In an additional embodiment, a heads-up display (HUD) projection system is provided. The HUD system comprises a display unit configured to display an image to be viewed by a user of a HUD system; and a mirror configured to reflect the image to a viewing area viewable by the user. The mirror comprises a glass-based substrate having a first major surface that is reflective, a second major surface opposite to the first major surface, and a minor surface connecting the first and second major surfaces, a first chamfer at an edge of the first major surface, the first chamfer having a first end at an intersection of the first chamfer and the first major surface and having a second end at an intersection of the first chamfer and the minor surface, and a second chamfer at an edge of the second major surface, the second chamfer having a first end at an intersection of the second chamfer and the second major surface and having a second end at an intersection of the second chamfer and the minor surface. The first chamfer has a different size or shape from the second chamfer.

The first chamfer has a first length, the second chamfer has a second length, and the first length is different than the second length, and the first length is greater than the second length. The first length is measured in a direction that is in-plane with the first major surface at the intersection with the first chamfer and is measured from the first end of the first chamfer to a plane that is co-planar with the minor surface at the second end of the first chamfer, and the second length is measured in a direction that is in-plane with the second major surface and is measured from the first end of the second chamfer to a plane that is co-planar with the minor surface at the second end of the second chamfer. The first length can be at least about 1.0 mm; from about 1.0 mm to about 3.0 mm; or about 2.0 mm.

The first chamfer can include a first inclined surface at a first angle measured with respect to the first surface, wherein the first inclined surface intersects the first major surface at a first distance of about 0.5 mm to about 3 mm from a minor plane co-planar with the minor surface at the second end of the first chamfer, and intersects the minor surface at a second distance of about 0.2 mm to about 0.3 mm from a first major plane co-planar with the first major surface at the first end of the first chamfer. The second chamfer can include a second inclined surface at a second angle measured with respect to the second surface, wherein the second inclined surface intersects the second major surface at a first distance of about 0.2 mm to about 0.3 mm from a minor plane co-planar with the minor surface at the second end of the second chamfer, and intersects the minor surface at a second distance of about 0.2 mm to about 0.3 mm from a second major plane co-planar with the second major surface at the first end of the first chamfer. The first angle is about 3 degrees to about 31 degrees, and the second angle is about 33 degrees to about 57 degrees. In some embodiments, the first angle is from about 5 degrees to about 45 degrees, and the second angle is from about 5 degrees to about 45 degrees.

In additional aspects of the some embodiments, the first chamfer comprises a first inclined surface at a first angle measured with respect to the first surface, and the second chamfer comprises a second inclined surface at a second angle measured with respect to the second surface, and the first angle is different than the second angle. The first angle is smaller than the second angle. The first inclined surface extends from the first edge to the second edge of the first chamfer, and the second inclined surface extends from the first edge to the second edge of the second chamfer.

As aspects of some embodiments, the first major surface has a first radius of curvature such that the first major surface has a concave shape and the second major surface has a convex shape, the first radius of curvature being measured relative to a first axis of curvature. The mirror has a second radius of curvature that is measured relative to a second axis of curvature different from the first axis of curvature, where the first axis of curvature can be perpendicular to the second axis of curvature. The first major surface can have an aspheric shape. The first major surface that is reflective can include a reflective coating on the glass-based substrate, and the reflective coating can comprise a metal, a metal oxide, a ceramic oxide, or a metal-ceramic alloy, and may include aluminum or silver.

In some embodiments, the display unit comprises an LCD, LED, OLED, or μLED display panel, or includes a projector. The HUD system can further include a projection surface configured to display a projected image to a user of the HUD system, wherein the mirror is configured to reflect the image produced by the display unit to form the projected image on the projection surface. The projection surface has a curvature corresponding to a curvature of the mirror, and the curvature of the projection surface is substantially the same as the curvature of the mirror. The projection surface can be a windshield or a combiner. Also, the projection surface can have an aspheric shape.

The glass-based substrate has a thickness that is less than or equal to 3.0 mm; from about 0.5 mm to about 3.0 mm; from about 0.5 mm to about 1.0 mm; or from about 1.0 mm to about 3.0 mm.

In aspects of some embodiments of the HUD projection system, the second major surface comprises one or more manufacturing artifacts, wherein the manufacturing artifacts are confined to a perimeter region of the second major surface, the perimeter region extending from the edge of the second major surface to a distance that is less than the first length. The manufacturing artifacts can be vacuum suction artifacts from a process of bending the mirror.

In some additional embodiments, a method of forming a three-dimensional mirror is provided. The method includes providing a glass-based mirror preform having a first major surface, a second major surface opposite to the first major surface, and a minor surface connecting the first and second major surfaces, the glass preform having a flat shape; forming a first chamfer at an edge of the first major surface; forming a second chamfer at an edge of the second major surface, the second chamfer having a different size or shape from the first chamfer; disposing the glass-based preform on a molding apparatus having a curved support surface with the second major surface facing the curved support surface; and conforming the glass-based preform to the curved support surface to form a curved mirror substrate having a first radius of curvature. The conforming of the glass-based preform to the curved support surface is performed at a temperature that is less than a glass transition temperature of the glass-based preform, and a temperature of the glass-based substrate may not be raised above the glass transition temperature of the glass-based substrate during or after the conforming.

As aspects of some embodiments, the curved support surface has a concave shape, and the concave shape can be an aspheric shape. The curved support surface can include a vacuum chuck with at least one opening in the curved support surface, and the method may further include supplying a vacuum to the at least one opening to conform the curved glass blank to the curved support surface. The at least one opening is a ditch-type vacuum hole. The first chamfer is formed in the first major surface such that the first chamfer begins at a first distance from the minor surface. When the glass-based preform is disposed on the curved support surface, the at least one opening is a second distance from the minor surface, wherein the first distance is greater than or equal to the second distance. In aspects of some embodiments, the molding apparatus comprises a raised perimeter surface or wall adjacent the curved support surface and defining a space on the curved support surface in which the glass-based preform is to be disposed. The first chamfer is formed in the first major surface such the first chamfer begins at a first distance from the minor surface, the at least one opening is a second distance from the raised perimeter surface or wall, and the first distance is greater than or equal to the second distance, or the first distance is greater than the second distance.

The method can further include forming a reflective layer on the first major surface. The reflective layer is formed by sputtering, plating, or vapor deposition of a material of the reflective layer onto the first major surface, and the reflective layer comprises a metal, a metal oxide, a ceramic oxide, or a metal-ceramic alloy, and can include aluminum or silver. The reflective layer is formed on the first major surface after forming the curved mirror substrate to form an aspheric mirror.

As aspects of some embodiments, the first chamfer comprises a first inclined surface at a first angle measured with respect to the first surface, the first inclined surface having a first length, the second chamfer comprises a second inclined surface at a second angle measured with respect to the second surface, where the second inclined surface having a second length, and the first length is different than the second length, or the first length is greater than the second length. The first length is measured in a direction that is in-plane with the first major surface and is measured from an intersection of the first inclined surface and the first major surface to a plane that is co-planar with the minor surface, and the second length is measured in a direction that is in-plane with the second major surface and is measured from an intersection of the second inclined surface and the second major surface to a plane that is co-planar with the minor surface. The first length can be at least about 1.0 mm; from about 1.0 mm to about 3.0 mm; or about 2.0 mm. The first inclined surface intersects the first major surface at about 0.5 mm to about 3 mm from a first plane co-planar with the minor surface, and intersects the minor surface at about 0.2 mm to about 0.3 mm from a second plane co-planar with the first major surface. The second inclined surface intersects the second major surface at about 0.2 mm to about 0.3 mm from a plane co-planar with the minor surface, and intersects the minor surface at about 0.2 mm to about 0.3 mm from a plane co-planar with the second major surface. The first angle is smaller than the second angle.

In another embodiment, a heads-up display (HUD) system is provided, comprising a projection surface for viewing a projected image by a user of the HUD system; a display unit configured to produce an image to be viewed by the user on the projection surface; and a mirror configured to reflect the image to the projection surface to form the projected image. The mirror includes a glass-based substrate having a first major surface that is reflective, a second major surface opposite to the first major surface, and a minor surface connecting the first and second major surfaces; a first chamfer at an edge of the first major surface, the first chamfer; and a second chamfer at an edge of the second major surface, wherein the first chamfer has a different size or shape from the second chamfer. The first chamfer has a first end at an intersection of the first chamfer and the first major surface and has a second end at an intersection of the first chamfer and the minor surface, and the second chamfer has a first end at an intersection of the second chamfer and the second major surface and has a second end at an intersection of the second chamfer and the minor surface. The first chamfer has a first length, the second chamfer has a second length, and the first length is different than the second length, or the first length is greater than the second length.

As an aspect of some embodiments, the first chamfer has a first length, the second chamfer has a second length, and the first length is different than the second length, where the first length is measured in a direction that is in-plane with the first major surface at the intersection with the first chamfer and is measured from the first end of the first chamfer to a plane that is co-planar with the minor surface at the second end of the first chamfer, and the second length is measured in a direction that is in-plane with the second major surface and is measured from the first end of the second chamfer to a plane that is co-planar with the minor surface at the second end of the second chamfer. The first length is at least about 1.0 mm; is from about 1.0 mm to about 3.0 mm; or is about 2.0 mm.

As another aspect of some embodiments, the first chamfer comprises a first inclined surface at a first angle measured with respect to the first surface, wherein the first inclined surface intersects the first major surface at a first distance of about 0.5 mm to about 3 mm from a minor plane co-planar with the minor surface at the second end of the first chamfer, and intersects the minor surface at a second distance of about 0.2 mm to about 0.3 mm from a first major plane co-planar with the first major surface at the first end of the first chamfer. The second chamfer comprises a second inclined surface at a second angle measured with respect to the second surface, wherein the second inclined surface intersects the second major surface at a first distance of about 0.2 mm to about 0.3 mm from a minor plane co-planar with the minor surface at the second end of the second chamfer, and intersects the minor surface at a second distance of about 0.2 mm to about 0.3 mm from a second major plane co-planar with the second major surface at the first end of the first chamfer. The first angle is about 3 degrees to about 31 degrees, and the second angle is about 33 degrees to about 57 degrees; or the first angle is from about 5 degrees to about 45 degrees, and the second angle is from about 5 degrees to about 45 degrees. The first angle can be different than the second angle, and the first angle can be smaller than the second angle. A length of the first inclined surface as measured in a direction parallel to the first major surface is about 0.5 mm to 3 mm, and a length of the first inclined surface as measured in a direction parallel to the minor surface is about 0.2 mm to 0.3 mm. A length of the second inclined surface as measured in a direction parallel to the second major surface is about 0.2 mm to 0.3 mm, and a length of the second inclined surface as measured in a direction parallel to the minor surface is about 0.2 mm to 0.3 mm.

In some aspects of the embodiments, the first major surface has a first radius of curvature such that the first major surface has a concave shape and the second major surface has a convex shape, the first radius of curvature being measured relative to a first axis of curvature. The first major surface can also have a second radius of curvature that is measured relative to a second axis of curvature that is different from the first axis of curvature. The first axis of curvature is perpendicular to the second axis of curvature.

The first major surface can have an aspheric shape, and the aspheric shape corresponds to a shape of the projection surface. The first major surface that is reflective comprises a reflective coating on the glass-based substrate. The reflective coating comprises a metal, a metal oxide, a ceramic oxide, or a metal-ceramic alloy, and the metal can be aluminum or silver.

In aspects of embodiments of the HUD system, the display unit comprises an LCD, LED, OLED, or μLED display panel, and can include a projector.

The glass-based substrate has a thickness that is less than or equal to 3.0 mm; from about 0.5 mm to about 3.0 mm; from about 0.5 mm to about 1.0 mm; from about 1.0 mm to about 3.0 mm; or about 2.0 mm.

As an aspect of some embodiments, the chamfering of the first major surface is configured to reduce edge distortion of the projected image. The chamfering of the first major surface can be configured to reduce an amount of unwanted light reflected toward the user. The projection surface can be a windshield of a vehicle, or a combiner configured to be mounted in a vehicle interior.

In some other embodiments, a heads-up display (HUD) projection system is provided, comprising a display unit configured to display an image to be viewed by a user of a HUD system; and a mirror configured to reflect the image to a viewing area viewable by the user. The mirror includes a glass-based substrate having a first major surface that is reflective, a second major surface opposite to the first major surface, and a minor surface connecting the first and second major surfaces, and a chamfer at an edge of the first major surface, the chamfer having a first length.

As aspects of some embodiments, the first length is measured in a direction that is in-plane with the first major surface and is measured from an intersection of the first inclined surface and the first major surface to a plane that is co-planar with the minor surface, and the first length is at least about 1.0 mm; is from about 1.0 mm to about 3.0 mm; or is about 2.0 mm. The chamfer intersects the first major surface at about 0.5 mm to about 3 mm from a first plane co-planar with the minor surface, and intersects the minor surface at about 0.2 mm to about 0.3 mm from a second plane co-planar with the first major surface.

The mirror has a first radius of curvature such that the first major surface has a concave shape and the second major surface has a convex shape, the first radius of curvature being relative to a first axis of curvature. The mirror can also have a second radius of curvature that is relative to a second axis of curvature different from the first axis of curvature, where the first axis of curvature is perpendicular to the second axis of curvature. In some preferred embodiments, the first major surface has an aspheric shape.

The first major surface that is reflective comprises a reflective coating on the glass-based substrate, where the reflective coating comprises a metal, a metal oxide, a ceramic oxide, or a metal-ceramic alloy, and can include aluminum or silver. The display unit can include an LCD, LED, OLED, or μLED display panel, and/or a projector. The HUD system can further include a projection surface for viewing a projected image by a user of the HUD system, where the display unit configured to produce an image, and the mirror is configured to reflect the image to form the projected image on the projection surface. The projection surface has a shape that is substantially the same as a shape of the mirror, where the projection surface is a windshield or a combiner, and the projection surface can have an aspheric shape.

In some embodiments, the second major surface comprises one or more manufacturing artifacts, and the manufacturing artifacts are confined to a perimeter region of the second major surface at a distance from the edge of the second major surface that is less than the first length. The manufacturing artifacts are vacuum suction artifacts from a process of bending the mirror.

The glass-based substrate has a thickness that is less than or equal to 3.0 mm; from about 0.5 mm to about 3.0 mm; from about 0.5 mm to about 1.0 mm; from about 1.0 mm to about 3.0 mm; or about 2.0 mm.

Suitable glass substrates for mirrors in HUD systems can be non-strengthened glass sheets or can also be strengthened glass sheets. The glass sheets (whether strengthened or non-strengthened) may include soda-lime glass, aluminosilicate, boroaluminosilicate or alkali aluminosilicate glass. Optionally, the glass sheets may be thermally strengthened.

Suitable glass substrates may be chemically strengthened by an ion exchange process. In this process, typically by immersion of the glass sheet into a molten salt bath for a predetermined period of time, ions at or near the surface of the glass sheet are exchanged for larger metal ions from the salt bath. In one embodiment, the temperature of the molten salt bath is about 430° C. and the predetermined time period is about eight hours. The incorporation of the larger ions into the glass strengthens the sheet by creating a compressive stress in a near surface region. A corresponding tensile stress is induced within a central region of the glass to balance the compressive stress.

Exemplary ion-exchangeable glasses that are suitable for forming glass substrates are soda lime glasses, alkali aluminosilicate glasses or alkali aluminoborosilicate glasses, though other glass compositions are contemplated. As used herein, "ion exchangeable" means that a glass is capable of exchanging cations located at or near the surface of the glass with cations of the same valence that are either larger or smaller in size. One exemplary glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass sheets include at least 6 wt. % aluminum oxide. In a further embodiment, a glass sheet includes one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further exemplary glass composition suitable for forming glass substrates comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further exemplary glass composition comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq (MgO+CaO) \leq 7$ mol. %.

In a particular embodiment, an alkali aluminosilicate glass comprises alumina, at least one alkali metal and, in some embodiments, greater than 50 mol. % $SiO_2$, in other embodiments at least 58 mol. % SiO$_2$, and in still other embodiments at least 60 mol. % SiO$_2$, wherein the ratio $$\frac{Al_2O_3 + B_2O_3}{\Sigma modifiers} > 1,$$

where in the ratio the components are expressed in mol. % and the modifiers are alkali metal oxides. This glass, in particular embodiments, comprises, consists essentially of, or consists of: 58-72 mol. % SiO$_2$; 9-17 mol. % Al$_2$O$_3$; 2-12 mol. % B$_2$O$_3$; 8-16 mol. % Na$_2$O; and 0-4 mol. % K$_2$O, wherein the ratio $$\frac{Al_2O_3 + B_2O_3}{\Sigma modifiers} > 1.$$

In another embodiment, an alkali aluminosilicate glass comprises, consists essentially of, or consists of: 61-75 mol. % SiO$_2$; 7-15 mol. % Al$_2$O$_3$; 0-12 mol. % B$_2$O$_3$; 9-21 mol. % Na$_2$O; 0-4 mol. % K$_2$O; 0-7 mol. % MgO; and 0-3 mol. % CaO.

In yet another embodiment, an alkali aluminosilicate glass substrate comprises, consists essentially of, or consists of: 60-70 mol. % SiO$_2$; 6-14 mol. % Al$_2$O$_3$; 0-15 mol. % B$_2$O$_3$; 0-15 mol. % Li$_2$O; 0-20 mol. % Na$_2$O; 0-10 mol. % K$_2$O; 0-8 mol. % MgO; 0-10 mol. % CaO; 0-5 mol. % ZrO$_2$; 0-1 mol. % SnO$_2$; 0-1 mol. % CeO$_2$; less than 50 ppm As$_2$O$_3$; and less than 50 ppm Sb$_2$O$_3$; wherein 12 mol. %≤Li$_2$O+Na$_2$O+K$_2$O≤20 mol. % and 0 mol. %≤MgO+CaO≤10 mol. %.

In still another embodiment, an alkali aluminosilicate glass comprises, consists essentially of, or consists of: 64-68 mol. % SiO$_2$; 12-16 mol. % Na$_2$O; 8-12 mol. % Al$_2$O$_3$; 0-3 mol. % B$_2$O$_3$; 2-5 mol. % K$_2$O; 4-6 mol. % MgO; and 0-5 mol. % CaO, wherein: 66 mol. %≤SiO$_2$+B$_2$O$_3$+CaO≤69 mol. %; Na$_2$O+K$_2$O+B$_2$O$_3$+MgO+CaO+SrO>10 mol. %; 5 mol. %≤MgO+CaO+SrO≤8 mol. %; (Na$_2$O+B$_2$O$_3$)—Al$_2$O$_3$≤2 mol. %; 2 mol. %≤Na$_2$O—Al$_2$O$_3$≤6 mol. %; and 4 mol. %≤(Na$_2$O+K$_2$O)—Al$_2$O$_3$≤10 mol. %.

The chemically-strengthened as well as the non-chemically-strengthened glass, in some embodiments, can be batched with 0-2 mol. % of at least one fining agent selected from a group that includes Na$_2$SO$_4$, NaCl, NaF, NaBr, K$_2$SO$_4$, KCl, KF, KBr, and SnO$_2$.

In one exemplary embodiment, sodium ions in the chemically-strengthened glass can be replaced by potassium ions from the molten bath, though other alkali metal ions having a larger atomic radii, such as rubidium or cesium, can replace smaller alkali metal ions in the glass. According to particular embodiments, smaller alkali metal ions in the glass can be replaced by Ag$^+$ ions. Similarly, other alkali metal salts such as, but not limited to, sulfates, halides, and the like may be used in the ion exchange process.

The replacement of smaller ions by larger ions at a temperature below that at which the glass network can relax produces a distribution of ions across the surface of the glass that results in a stress profile. The larger volume of the incoming ion produces a compressive stress (CS) on the surface and tension (central tension, or CT) in the center of the glass. The compressive stress is related to the central tension by the following relationship:

$$CS = CT\left(\frac{t - 2DOL}{DOL}\right)$$

where t is the total thickness of the glass sheet and DOL is the depth of exchange, also referred to as depth of layer.

According to various embodiments, glass substrates comprising ion-exchanged glass can possess an array of desired properties, including low weight, high impact resistance, and improved sound attenuation. In one embodiment, a chemically-strengthened glass sheet can have a surface compressive stress of at least 300 MPa, e.g., at least 400, 450, 500, 550, 600, 650, 700, 750 or 800 MPa, a depth of layer at least about 20 μm (e.g., at least about 20, 25, 30, 35, 40, 45, or 50 μm) and/or a central tension greater than 40 MPa (e.g., greater than 40, 45, or 50 MPa) but less than 100 MPa (e.g., less than 100, 95, 90, 85, 80, 75, 70, 65, 60, or 55 MPa).

Suitable glass substrates may be thermally strengthened by a thermal tempering process or an annealing process. The thickness of the thermally-strengthened glass sheets may be less than about 2 mm or less than about 1 mm.

Exemplary glass sheet forming methods include fusion draw and slot draw processes, which are each examples of a down-draw process, as well as float processes. These methods can be used to form both strengthened and non-strengthened glass sheets. The fusion draw process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank. These outside surfaces extend down and inwardly so that they join at an edge below the drawing tank. The two flowing glass surfaces join at this edge to fuse and form a single flowing sheet. The fusion draw method offers the advantage that, because the two glass films flowing over the channel fuse together, neither outside surface of the resulting glass sheet comes in contact with any part of the apparatus. Thus, the surface properties of the fusion drawn glass sheet are not affected by such contact.

The slot draw method is distinct from the fusion draw method. Here the molten raw material glass is provided to a drawing tank. The bottom of the drawing tank has an open slot with a nozzle that extends the length of the slot. The molten glass flows through the slot/nozzle and is drawn downward as a continuous sheet and into an annealing region. The slot draw process can provide a thinner sheet than the fusion draw process because only a single sheet is drawn through the slot, rather than two sheets being fused together.

Down-draw processes produce glass sheets having a uniform thickness that possess surfaces that are relatively pristine. Because the strength of the glass surface is controlled by the amount and size of surface flaws, a pristine surface that has had minimal contact has a higher initial strength. When this high strength glass is then chemically strengthened, the resultant strength can be higher than that of a surface that has been a lapped and polished. Down-drawn glass may be drawn to a thickness of less than about 2 mm. In addition, down drawn glass has a very flat, smooth surface that can be used in its final application without costly grinding and polishing.

In the float glass method, a sheet of glass that may be characterized by smooth surfaces and uniform thickness is made by floating molten glass on a bed of molten metal, typically tin. In an exemplary process, molten glass that is fed onto the surface of the molten tin bed forms a floating ribbon. As the glass ribbon flows along the tin bath, the temperature is gradually decreased until a solid glass sheet can be lifted from the tin onto rollers. Once off the bath, the glass sheet can be cooled further and annealed to reduce internal stress.

As discussed in previous paragraphs, an exemplary glass substrate can include a glass sheet of chemically strengthened glass, e.g., Gorilla® Glass. This glass sheet may have been heat treated, ion exchanged and/or annealed. In a laminate structure, the strengthened glass sheet may be an inner layer, and an outer layer may be a non-chemically strengthened glass sheet such as conventional soda lime glass, annealed glass, or the like. The laminate structure can also include a polymeric interlayer intermediate the outer and inner glass layers. The strengthened glass sheet can have a thickness of less than or equal to 1.0 mm and having a residual surface CS level of between about 250 MPa to about 350 MPa with a DOL of greater than 60 microns. In another embodiment the CS level of the strengthened glass sheet is preferably about 300 MPa. Exemplary thicknesses of the glass sheet can range in thicknesses from about 0.3 mm to about 1.5 mm, from 0.5 mm to 1.5 mm to 2.0 mm or more.

In a preferred embodiment, the thin chemically strengthened glass sheet may have a surface stress between about 250 MPa and 900 MPa and can range in thickness from about 0.3 mm to about 1.0 mm. In an embodiment where this strengthened glass sheet is included in a laminate structure, the external layer can be annealed (non-chemically strengthened) glass with a thickness from about 1.5 mm to about 3.0 mm or more. Of course, the thicknesses of the outer and inner layers can be different in a respective laminate structure. Another preferred embodiment of an exemplary laminate structure may include an inner layer of 0.7 mm chemically strengthened glass, a poly-vinyl butyral layer of about 0.76 mm in thickness and a 2.1 mm exterior layer of annealed glass.

In some embodiments, exemplary glass substrates of embodiments discussed herein can be employed in vehicles (automobile, aircraft, and the like) having a Head-up or Heads-up Display (HUD) system. The clarity of fusion formed according to some embodiments can be superior to glass formed by a float process to thereby provide a better driving experience as well as improve safety since information can be easier to read and less of a distraction. A non-limiting HUD system can include a projector unit, a combiner, and a video generation computer. The projection unit in an exemplary HUD can be, but is not limited to, an optical collimator having a convex lens or concave mirror with a display (e.g., optical waveguide, scanning lasers, LED, CRT, video imagery, or the like) at its focus. The projection unit can be employed to produce a desired image. In some embodiments, the HUD system can also include a combiner or beam splitter to redirect the projected image from the projection unit to vary or alter the field of view and the projected image. Some combiners can include special coatings to reflect monochromatic light projected thereon while allowing other wavelengths of light to pass through. In additional embodiments, the combiner can also be curved to refocus an image from the projection unit. Any exemplary HUD system can also include a processing system to provide an interface between the projection unit and applicable vehicle systems from which data can be received, manipulated, monitored and/or displayed. Some processing systems can also be utilized to generate the imagery and symbology to be displayed by the projection unit.

Using such an exemplary HUD system, a display of information (e.g., numbers, images, directions, wording, or otherwise) can be created by projecting an image from the HUD system onto an interior facing surface of a glass-based mirror substrate. The mirror can then redirect the image so that it is in the field of view of a driver.

Exemplary glass substrates according to some embodiments can thus provide a thin, pristine surface for the mirror. In some embodiments, fusion drawn Gorilla Glass can be used as the glass substrate. Such glass does not contain any float lines typical of conventional glass manufactured with the float process (e.g., soda lime glass).

HUDs according to embodiments of the present disclosure can be employed in automotive vehicles, aircraft, synthetic vision systems, and/or mask displays (e.g., head mounted displays such as goggles, masks, helmets, and the like) utilizing exemplary glass substrates described herein. Such HUD systems can project critical information (speed, fuel, temperature, turn signal, navigation, warning messages, etc.) in front of the driver through the glass laminate structure.

According to some embodiments, the HUD systems described herein can use nominal HUD system parameters for radius of curvature, refractive index, and angle of incidence (e.g., radius of curvature $R_c$=8301 mm, distance to source: $R_f$=1000 mm, refractive index n=1.52, and angle of incidence θ=62.08°).

Applicants have shown that the glass substrates and laminate structures disclosed herein have excellent durability, impact resistance, toughness, and scratch resistance. As is well known among skilled artisans, the strength and mechanical impact performance of a glass sheet or laminate is limited by defects in the glass, including both surface and internal defects. When a glass sheet or laminate structure is impacted, the impact point is put into compression, while a ring or "hoop" around the impact point, as well as the opposite face of the impacted sheet, are put into tension. Typically, the origin of failure will be at a flaw, usually on the glass surface, at or near the point of highest tension. This may occur on the opposite face, but can occur within the ring. If a flaw in the glass is put into tension during an impact event, the flaw will likely propagate, and the glass will typically break. Thus, a high magnitude and depth of compressive stress (depth of layer) is preferable.

Due to strengthening, one or both of the surfaces of the strengthened glass sheets disclosed herein are under compression. The incorporation of a compressive stress in a near surface region of the glass can inhibit crack propagation and failure of the glass sheet. In order for flaws to propagate and failure to occur, the tensile stress from an impact must exceed the surface compressive stress at the tip of the flaw. In embodiments, the high compressive stress and high depth of layer of strengthened glass sheets enable the use of thinner glass than in the case of non-chemically-strengthened glass.

Aspect (1) of this disclosure pertains to a glass-based preform for a mirror of a heads-up display (HUD) system, comprising: a glass-based substrate having a first major surface, a second major surface opposite to the first major surface, and a minor surface connecting the first and second major surfaces; a first chamfer at an edge of the first major surface, the first chamfer having a first end at an intersection of the first chamfer and the first major surface and having a second end at an intersection of the first chamfer and the minor surface; and a second chamfer at an edge of the second major surface, the second chamfer having a first end at an intersection of the second chamfer and the second major surface and having a second end at an intersection of the second chamfer and the minor surface, wherein the first chamfer has a different size or shape from the second chamfer.

Aspect (2) of this disclosure pertains to the glass-based preform of Aspect (1), wherein the first chamfer has a first length, the second chamfer has a second length, and the first length is different than the second length.

Aspect (3) of this disclosure pertains to the glass-based preform of Aspect (2), wherein the first length is greater than the second length.

Aspect (4) of this disclosure pertains to the glass-based preform of Aspect (2) or Aspect (3), wherein the first length is measured in a direction that is in-plane with the first major surface at the intersection with the first chamfer and is measured from the first end of the first chamfer to a plane that is co-planar with the minor surface at the second end of the first chamfer, and wherein the second length is measured in a direction that is in-plane with the second major surface and is measured from the first end of the second chamfer to a plane that is co-planar with the minor surface at the second end of the second chamfer.

Aspect (5) of this disclosure pertains to the glass-based preform of any one of Aspects (2)-(4), wherein the first length is at least about 1.0 mm.

Aspect (6) of this disclosure pertains to the glass-based preform of any one of Aspects (2)-(5), wherein the first length is from about 1.0 mm to about 3.0 mm.

Aspect (7) of this disclosure pertains to the glass-based preform of any one of Aspects (1)-(6), wherein the first chamfer comprises a first inclined surface at a first angle measured with respect to the first surface, wherein the first inclined surface intersects the first major surface at a first distance of about 0.5 mm to about 3 mm from a minor plane co-planar with the minor surface at the second end of the first chamfer, and intersects the minor surface at a second distance of about 0.2 mm to about 0.3 mm from a first major plane co-planar with the first major surface at the first end of the first chamfer.

Aspect (8) of this disclosure pertains to the glass-based preform of any one of Aspects (1)-(7), wherein the second chamfer comprises a second inclined surface at a second angle measured with respect to the second surface, wherein the second inclined surface intersects the second major surface at a first distance of about 0.2 mm to about 0.3 mm from a minor plane co-planar with the minor surface at the second end of the second chamfer, and intersects the minor surface at a second distance of about 0.2 mm to about 0.3 mm from a second major plane co-planar with the second major surface at the first end of the first chamfer.

Aspect (9) of this disclosure pertains to the glass-based preform of Aspect (8), wherein the first angle is about 3 degrees to about 31 degrees, and the second angle is about 33 degrees to about 57 degrees.

Aspect (10) of this disclosure pertains to the glass-based preform of Aspect (8), wherein the first angle is from about 5 degrees to about 45 degrees, and the second angle is from about 5 degrees to about 45 degrees.

Aspect (11) of this disclosure pertains to the glass-based preform of any one of Aspects (1)-(7), wherein the first chamfer comprises a first inclined surface at a first angle measured with respect to the first surface, and the second chamfer comprises a second inclined surface at a second angle measured with respect to the second surface, and wherein the first angle is different than the second angle.

Aspect (12) of this disclosure pertains to the glass-based preform of any one of Aspects (8)-(11), wherein the first angle is smaller than the second angle.

Aspect (13) of this disclosure pertains to the glass-based preform of any one of Aspects (7)-(12), wherein the first inclined surface extends from the first edge to the second edge of the first chamfer, and wherein the second inclined surface extends from the first edge to the second edge of the second chamfer.

Aspect (14) of this disclosure pertains to the glass-based preform of any one of Aspects (1)-(13), wherein at least a portion of the first major surface is reflective.

Aspect (15) of this disclosure pertains to the glass-based preform of Aspect (14), wherein the portion of the first major surface that is reflective comprises a reflective coating on the glass-based substrate.

Aspect (16) of this disclosure pertains to the glass-based preform of Aspect (15), wherein the reflective coating comprises a metal, a metal oxide, a ceramic oxide, or a metal-ceramic alloy.

Aspect (17) of this disclosure pertains to the glass-based preform of Aspect (15) or Aspect (16), wherein the reflective coating comprises aluminum or silver.

Aspect (18) of this disclosure pertains to the glass-based preform of any one of Aspects (1)-(17), wherein a length of the first inclined surface as measured in a direction parallel to the first major surface is about 0.5 mm to 3 mm, and a length of the first inclined surface as measured in a direction parallel to the minor surface is about 0.2 mm to 0.3 mm.

Aspect (19) of this disclosure pertains to the glass-based preform of any one of Aspects (1)-(18), wherein a length of the second inclined surface as measured in a direction parallel to the second major surface is about 0.2 mm to 0.3 mm, and a length of the second inclined surface as measured in a direction parallel to the minor surface is about 0.2 mm to 0.3 mm.

Aspect (20) of this disclosure pertains to the glass-based preform of any one of Aspects (1)-(19), wherein the glass-based substrate has a thickness that is less than or equal to 3.0 mm.

Aspect (21) of this disclosure pertains to the glass-based preform of any one of Aspects (20), wherein the thickness of the glass-based substrate is from about 0.5 mm to about 3.0 mm.

Aspect (22) of this disclosure pertains to the glass-based preform of Aspect (21), wherein the thickness of the glass-based substrate is from about 0.5 mm to about 1.0 mm.

Aspect (23) of this disclosure pertains to the glass-based preform of Aspect (21), wherein the thickness of the glass-based substrate is from about 1.0 mm to about 3.0 mm.

Aspect (24) of this disclosure pertains to the glass-based preform of any one of Aspects (1)-(23), wherein the second major surface comprises one or more manufacturing artifacts, and wherein the manufacturing artifacts are confined to a perimeter region of the second major surface, the perimeter region extending from the edge of the second major surface to a distance that is less than the first length.

Aspect (25) of this disclosure pertains to the glass-based preform of Aspect (24), wherein the manufacturing artifacts are vacuum suction artifacts.

Aspect (26) of this disclosure pertains to the glass-based preform of Aspect (24) or Aspect (25), wherein the manufacturing artifacts are from a process of bending the mirror.

Aspect (27) of this disclosure pertains to a mirror for a heads-up display (HUD) system comprising the glass-based preform of any one of claims 1-26.

Aspect (28) of this disclosure pertains to the mirror of Aspect (27), further comprising a reflective layer on the first major surface of the glass-based preform.

Aspect (29) of this disclosure pertains to the mirror of Aspect (27) or Aspect (28), wherein the glass-based substrate has a first radius of curvature such that the first major surface has a concave shape and the second major surface has a convex shape, the first radius of curvature being measured with respect to a first axis of curvature.

Aspect (30) of this disclosure pertains to the mirror of Aspect (29), wherein the glass-based substrate has a second radius of curvature measured with respect to a second axis of curvature different from the first axis of curvature.

Aspect (31) of this disclosure pertains to the mirror of Aspect (30), wherein the first axis of curvature is perpendicular to the second axis of curvature.

Aspect (32) of this disclosure pertains to the mirror of any one of Aspects (27)-(31), wherein the first major surface has an aspheric shape.

Aspect (33) of this disclosure pertains to a method of forming a three-dimensional mirror, the method comprising: providing a glass-based mirror preform comprising a first major surface having an edge with a first chamfer, a second major surface opposite to the first major surface and having an edge with a second chamfer, and a minor surface connecting the first and second major surfaces, the second chamfer having a different size or shape than the first chamfer; disposing the glass-based preform on a molding apparatus having a curved support surface with the second major surface facing the curved support surface; and conforming the glass-based preform to the curved support surface to form a curved mirror substrate having a first radius of curvature.

Aspect (34) of this disclosure pertains to the method of Aspect (33), wherein the conforming of the glass-based preform to the curved support surface is performed at a temperature that is less than a glass transition temperature of the glass-based preform.

Aspect (35) of this disclosure pertains to the method of Aspect (33) or Aspect (34), wherein a temperature of the glass-based substrate is not raised above the glass transition temperature of the glass-based substrate during or after the conforming.

Aspect (36) of this disclosure pertains to the method of any one of Aspects (33)-(35), wherein the curved support surface has a concave shape.

Aspect (37) of this disclosure pertains to the method of Aspect (36), wherein the concave shape is an aspheric shape.

Aspect (38) of this disclosure pertains to the method of any one of Aspects (33)-(37), wherein the curved support surface comprises a vacuum chuck with at least one opening in the curved support surface.

Aspect (39) of this disclosure pertains to the method of Aspect (38), further comprising supplying a vacuum to the at least one opening to conform the curved glass blank to the curved support surface.

Aspect (40) of this disclosure pertains to the method of Aspect (38) or Aspect (39), wherein the at least one opening is a ditch-type vacuum hole.

Aspect (41) of this disclosure pertains to the method of any one of Aspects (38)-(40), wherein the first chamfer is formed in the first major surface such that the first chamfer begins in the first major surface at a first distance from the minor surface, wherein, when the glass-based preform is disposed on the curved support surface, the at least one opening is a second distance from the minor surface, and wherein the first distance is greater than or equal to the second distance.

Aspect (42) of this disclosure pertains to the method of any one of Aspects (38)-(41), wherein the molding apparatus comprises a raised perimeter surface or wall adjacent the curved support surface and defining a space on the curved support surface in which the glass-based preform is to be disposed.

Aspect (43) of this disclosure pertains to the method of Aspect (42), wherein the first chamfer is formed in the first major surface such the first chamfer begins in the first major surface at a first distance from the minor surface, wherein the at least one opening is a second distance from the raised perimeter surface or wall, and wherein the first distance is greater than or equal to the second distance.

Aspect (44) of this disclosure pertains to the method of any one of Aspects (41)-(43), wherein the first distance is greater than the second distance.

Aspect (45) of this disclosure pertains to the method of any one of Aspects (33)-(44), further comprising forming a reflective layer on the first major surface.

Aspect (46) of this disclosure pertains to the method of Aspect (45), wherein the reflective layer is formed by sputtering, plating, or vapor deposition of a material of the reflective layer onto the first major surface.

Aspect (47) of this disclosure pertains to the method of Aspect (45) or Aspect (46), wherein the reflective layer comprises a metal, a metal oxide, a ceramic oxide, or a metal-ceramic alloy.

Aspect (48) of this disclosure pertains to the method of Aspect (47), wherein the reflective layer comprises aluminum or silver.

Aspect (49) of this disclosure pertains to the method of any one of Aspects (45)-(48), wherein the reflective layer is formed on the first major surface after forming the curved mirror substrate to form an aspheric mirror.

Aspect (50) of this disclosure pertains to the method of any one of Aspects (33)-(49), wherein the first chamfer comprises a first inclined surface at a first angle measured with respect to the first surface, the first inclined surface having a first length, wherein the second chamfer comprises a second inclined surface at a second angle measured with respect to the second surface, the second inclined surface having a second length, and wherein the first length is different than the second length.

Aspect (51) of this disclosure pertains to the method of Aspect (50), wherein the first length is greater than the second length.

Aspect (52) of this disclosure pertains to the method of Aspect (50) or Aspect (51), wherein the first length is measured in a direction that is in-plane with the first major surface and is measured from an intersection of the first inclined surface and the first major surface to a plane that is co-planar with the minor surface, and wherein the second length is measured in a direction that is in-plane with the second major surface and is measured from an intersection of the second inclined surface and the second major surface to a plane that is co-planar with the minor surface.

Aspect (53) of this disclosure pertains to the method of any one of Aspects (50)-(52), wherein the first length is at least about 1.0 mm.

Aspect (54) of this disclosure pertains to the method of Aspect (53), wherein the first length is from about 1.0 mm to about 3.0 mm.

Aspect (55) of this disclosure pertains to the method of Aspect (53), wherein the first inclined surface intersects the first major surface at about 0.5 mm to about 3 mm from a first plane co-planar with the minor surface, and intersects the minor surface at about 0.2 mm to about 0.3 mm from a second plane co-planar with the first major surface.

Aspect (56) of this disclosure pertains to the method of Aspect (50) or Aspect (55), wherein the second inclined surface intersects the second major surface at about 0.2 mm to about 0.3 mm from a plane co-planar with the minor surface, and intersects the minor surface at about 0.2 mm to about 0.3 mm from a plane co-planar with the second major surface.

Aspect (57) of this disclosure pertains to the method of any one of Aspects (33)-(49), wherein the first chamfer defines a first inclined surface at a first angle measured with respect to the first surface, and the second chamfer defines a second inclined surface at a second angle measured with respect to the second surface, and wherein the first angle is different than the second angle.

Aspect (58) of this disclosure pertains to the method of Aspect (57), wherein the first angle is smaller than the second angle.

Aspect (59) of this disclosure pertains to a heads-up display (HUD) projection system, comprising: a display unit configured to display an image to be viewed by a user of a HUD system; and a mirror configured to reflect the image to a viewing area viewable by the user, the mirror comprising: a glass-based substrate having a first major surface that is reflective, a second major surface opposite to the first major surface, and a minor surface connecting the first and second major surfaces, a first chamfer at an edge of the first major surface, the first chamfer having a first end at an intersection of the first chamfer and the first major surface and having a second end at an intersection of the first chamfer and the minor surface, and a second chamfer at an edge of the second major surface, the second chamfer having a first end at an intersection of the second chamfer and the second major surface and having a second end at an intersection of the second chamfer and the minor surface, wherein the first chamfer has a different size or shape from the second chamfer.

Aspect (60) of this disclosure pertains to the HUD projection system of Aspect (59), wherein the first chamfer has a first length, the second chamfer has a second length, and the first length is different than the second length.

Aspect (61) of this disclosure pertains to the HUD projection system of Aspect (60), wherein the first length is greater than the second length.

Aspect (62) of this disclosure pertains to the HUD projection system of Aspect (60) or Aspect (61), wherein the first length is measured in a direction that is in-plane with the first major surface at the intersection with the first chamfer and is measured from the first end of the first chamfer to a plane that is co-planar with the minor surface at the second end of the first chamfer, and wherein the second length is measured in a direction that is in-plane with the second major surface and is measured from the first end of the second chamfer to a plane that is co-planar with the minor surface at the second end of the second chamfer.

Aspect (63) of this disclosure pertains to the HUD projection system of any one of Aspects (60)-(62), wherein the first length is at least about 1.0 mm.

Aspect (64) of this disclosure pertains to the HUD projection system of Aspect (63), wherein the first length is from about 1.0 mm to about 3.0 mm.

Aspect (65) of this disclosure pertains to the HUD projection system of any one of Aspects (59)-(64), wherein the first chamfer comprises a first inclined surface at a first angle measured with respect to the first surface, wherein the first inclined surface intersects the first major surface at a first distance of about 0.5 mm to about 3 mm from a minor plane co-planar with the minor surface at the second end of the first chamfer, and intersects the minor surface at a second distance of about 0.2 mm to about 0.3 mm from a first major plane co-planar with the first major surface at the first end of the first chamfer.

Aspect (66) of this disclosure pertains to the HUD projection system of any one of Aspects (59)-(65), wherein the second chamfer comprises a second inclined surface at a second angle measured with respect to the second surface, wherein the second inclined surface intersects the second major surface at a first distance of about 0.2 mm to about 0.3 mm from a minor plane co-planar with the minor surface at the second end of the second chamfer, and intersects the minor surface at a second distance of about 0.2 mm to about 0.3 mm from a second major plane co-planar with the second major surface at the first end of the first chamfer.

Aspect (67) of this disclosure pertains to the HUD projection system of Aspect (66), wherein the first angle is about 3 degrees to about 31 degrees, and the second angle is about 33 degrees to about 57 degrees.

Aspect (68) of this disclosure pertains to the HUD projection system of Aspect (66), wherein the first angle is from about 5 degrees to about 45 degrees, and the second angle is from about 5 degrees to about 45 degrees.

Aspect (69) of this disclosure pertains to the HUD projection system of any one of Aspects (59)-(64), wherein the first chamfer comprises a first inclined surface at a first angle measured with respect to the first surface, and the second chamfer comprises a second inclined surface at a second angle measured with respect to the second surface, and wherein the first angle is different than the second angle.

Aspect (70) of this disclosure pertains to the HUD projection system of Aspect (69), wherein the first angle is smaller than the second angle.

Aspect (71) of this disclosure pertains to the HUD projection system of Aspect (69) or Aspect (70), wherein the first inclined surface extends from the first edge to the second edge of the first chamfer, and wherein the second inclined surface extends from the first edge to the second edge of the second chamfer.

Aspect (72) of this disclosure pertains to the HUD projection system of any one of Aspects (59)-(71), wherein the first major surface has a first radius of curvature such that the first major surface has a concave shape and the second major surface has a convex shape, the first radius of curvature being measured relative to a first axis of curvature.

Aspect (73) of this disclosure pertains to the HUD projection system of Aspect (72), wherein the mirror has a second radius of curvature that is measured relative to a second axis of curvature different from the first axis of curvature.

Aspect (74) of this disclosure pertains to the HUD projection system of Aspect (73), wherein the first axis of curvature is perpendicular to the second axis of curvature.

Aspect (75) of this disclosure pertains to the HUD projection system of any one of Aspects (59)-(74), wherein the first major surface has an aspheric shape.

Aspect (76) of this disclosure pertains to the HUD projection system of any one of Aspects (59)-(75), wherein the first major surface that is reflective comprises a reflective coating on the glass-based substrate.

Aspect (77) of this disclosure pertains to the HUD projection system of Aspect (76), wherein the reflective coating comprises a metal, a metal oxide, a ceramic oxide, or a metal-ceramic alloy.

Aspect (78) of this disclosure pertains to the HUD projection system of Aspect (76) or Aspect (77), wherein the reflective coating comprises aluminum or silver.

Aspect (79) of this disclosure pertains to the HUD projection system of any one of Aspects (59)-(78), wherein the display unit comprises an LCD, LED, OLED, or μLED display panel.

Aspect (80) of this disclosure pertains to the HUD projection system of any one of Aspects (59)-(79), wherein the display unit comprises a projector.

Aspect (81) of this disclosure pertains to the HUD projection system of any one of Aspects (59)-(80), wherein the glass-based substrate has a thickness that is less than or equal to 3.0 mm.

Aspect (82) of this disclosure pertains to the HUD projection system of Aspect (81), wherein the thickness of the glass-based substrate is from about 0.5 mm to about 3.0 mm.

Aspect (83) of this disclosure pertains to the HUD projection system of Aspects (82), wherein the thickness of the glass-based substrate is from about 0.5 mm to about 1.0 mm.

Aspect (84) of this disclosure pertains to the HUD projection system of Aspect (82), wherein the thickness of the glass-based substrate is from about 1.0 mm to about 3.0 mm.

Aspect (85) of this disclosure pertains to the HUD projection system any one of Aspect (58)-(84), further comprising a projection surface configured to display a projected image to a user of the HUD system, wherein the mirror is configured to reflect the image produced by the display unit to form the projected image on the projection surface.

Aspect (86) of this disclosure pertains to the HUD projection system of Aspect (85), wherein the projection surface has a curvature corresponding to a curvature of the mirror.

Aspect (87) of this disclosure pertains to the HUD projection system of Aspect (86), wherein the curvature of the projection surface is substantially the same as the curvature of the mirror.

Aspect (88) of this disclosure pertains to the HUD projection system of Aspect (86) or Aspect (87), wherein the projection surface is a windshield or a combiner.

Aspect (89) of this disclosure pertains to the HUD projection system of any one of Aspects (86)-(88), wherein the projection surface has an aspheric shape.

Aspect (90) of this disclosure pertains to the HUD projection system of any one of Aspects (59)-(89), wherein the second major surface comprises one or more manufacturing artifacts, and wherein the manufacturing artifacts are confined to a perimeter region of the second major surface, the perimeter region extending from the edge of the second major surface to a distance that is less than the first length.

Aspect (91) of this disclosure pertains to the HUD projection system of Aspect (90), wherein the manufacturing artifacts are vacuum suction artifacts.

Aspect (92) of this disclosure pertains to the HUD projection system of Aspect (90) or Aspect (91), wherein the manufacturing artifacts are from a process of bending the mirror.

Aspect (93) of this disclosure pertains to a method of forming a three-dimensional mirror, the method comprising: providing a glass-based mirror preform having a first major surface, a second major surface opposite to the first major surface, and a minor surface connecting the first and second major surfaces, the glass preform having a flat shape; forming a first chamfer at an edge of the first major surface; forming a second chamfer at an edge of the second major surface, the second chamfer having a different size or shape from the first chamfer; disposing the glass-based preform on a molding apparatus having a curved support surface with the second major surface facing the curved support surface; and conforming the glass-based preform to the curved support surface to form a curved mirror substrate having a first radius of curvature.

Aspect (94) of this disclosure pertains to the method of Aspect (93), wherein the conforming of the glass-based preform to the curved support surface is performed at a temperature that is less than a glass transition temperature of the glass-based preform.

Aspect (95) of this disclosure pertains to the method of Aspect (93) or Aspect (94), wherein a temperature of the glass-based substrate is not raised above the glass transition temperature of the glass-based substrate during or after the conforming.

Aspect (96) of this disclosure pertains to the method of any one of Aspects (93)-(95), wherein the curved support surface has a concave shape.

Aspect (97) of this disclosure pertains to the method of Aspect (96), wherein the concave shape is an aspheric shape.

Aspect (98) of this disclosure pertains to the method of any one of Aspects (93)-(97), wherein the curved support surface comprises a vacuum chuck with at least one opening in the curved support surface.

Aspect (99) of this disclosure pertains to the method of Aspect (98), further comprising supplying a vacuum to the at least one opening to conform the curved glass blank to the curved support surface.

Aspect (100) of this disclosure pertains to the method of Aspect (98) or Aspect (99), wherein the at least one opening is a ditch-type vacuum hole.

Aspect (101) of this disclosure pertains to the method of any one of Aspects (98)-(100), wherein the first chamfer is formed in the first major surface such that the first chamfer begins at a first distance from the minor surface, wherein, when the glass-based preform is disposed on the curved support surface, the at least one opening is a second distance from the minor surface, and wherein the first distance is greater than or equal to the second distance.

Aspect (102) of this disclosure pertains to the method of any one of Aspects (98)-(101), wherein the molding apparatus comprises a raised perimeter surface or wall adjacent the curved support surface and defining a space on the curved support surface in which the glass-based preform is to be disposed.

Aspect (103) of this disclosure pertains to the method of Aspect (102), wherein the first chamfer is formed in the first major surface such the first chamfer begins at a first distance from the minor surface, wherein the at least one opening is a second distance from the raised perimeter surface or wall, and wherein the first distance is greater than or equal to the second distance.

Aspect (104) of this disclosure pertains to the method of any one of Aspects (101)-(103), wherein the first distance is greater than the second distance.

Aspect (105) of this disclosure pertains to the method of any one of Aspects (93)-(104), further comprising forming a reflective layer on the first major surface.

Aspect (106) of this disclosure pertains to the method of Aspect (105), wherein the reflective layer is formed by sputtering, plating, or vapor deposition of a material of the reflective layer onto the first major surface.

Aspect (107) of this disclosure pertains to the method of Aspect (105) or Aspect (106), wherein the reflective layer comprises a metal, a metal oxide, a ceramic oxide, or a metal-ceramic alloy.

Aspect (108) of this disclosure pertains to the method of Aspect (107), wherein the reflective layer comprises aluminum or silver.

Aspect (109) of this disclosure pertains to the method of any one of Aspects (105)-(108), wherein the reflective layer is formed on the first major surface after forming the curved mirror substrate to form an aspheric mirror.

Aspect (110) of this disclosure pertains to the method of any one of Aspects (93)-(109), wherein the first chamfer comprises a first inclined surface at a first angle measured with respect to the first surface, the first inclined surface having a first length, wherein the second chamfer comprises a second inclined surface at a second angle measured with respect to the second surface, the second inclined surface having a second length, and wherein the first length is different than the second length.

Aspect (111) of this disclosure pertains to the method of Aspect (110), wherein the first length is greater than the second length.

Aspect (112) of this disclosure pertains to the method of Aspect (110) or Aspect (111), wherein the first length is measured in a direction that is in-plane with the first major surface and is measured from an intersection of the first inclined surface and the first major surface to a plane that is co-planar with the minor surface, and wherein the second length is measured in a direction that is in-plane with the second major surface and is measured from an intersection of the second inclined surface and the second major surface to a plane that is co-planar with the minor surface.

Aspect (113) of this disclosure pertains to the method of any one of Aspects (110)-(112), wherein the first length is at least about 1.0 mm.

Aspect (114) of this disclosure pertains to the method of Aspect (113), wherein the first length is from about 1.0 mm to about 3.0 mm.

Aspect (115) of this disclosure pertains to the method of Aspect (110), wherein the first inclined surface intersects the first major surface at about 0.5 mm to about 3 mm from a first plane co-planar with the minor surface, and intersects the minor surface at about 0.2 mm to about 0.3 mm from a second plane co-planar with the first major surface.

Aspect (116) of this disclosure pertains to the method of Aspects (110) or (115), wherein the second inclined surface intersects the second major surface at about 0.2 mm to about 0.3 mm from a plane co-planar with the minor surface, and intersects the minor surface at about 0.2 mm to about 0.3 mm from a plane co-planar with the second major surface.

Aspect (117) of this disclosure pertains to the method of any one of Aspects (110)-(116), wherein the first angle is smaller than the second angle.

Aspect (118) of this disclosure pertains to a heads-up display (HUD) system comprising: a projection surface for viewing a projected image by a user of the HUD system; a display unit configured to produce an image to be viewed by the user on the projection surface; and a mirror configured to reflect the image to the projection surface to form the projected image, the mirror comprising: a glass-based substrate having a first major surface that is reflective, a second major surface opposite to the first major surface, and a minor surface connecting the first and second major surfaces, a first chamfer at an edge of the first major surface, the first chamfer, and a second chamfer at an edge of the second major surface, wherein the first chamfer has a different size or shape from the second chamfer.

Aspect (119) of this disclosure pertains to the HUD system of Aspect (118), wherein the first chamfer has a first end at an intersection of the first chamfer and the first major surface and has a second end at an intersection of the first chamfer and the minor surface, and wherein the second chamfer has a first end at an intersection of the second chamfer and the second major surface and has a second end at an intersection of the second chamfer and the minor surface.

Aspect (120) of this disclosure pertains to the HUD system of Aspect (118) or Aspect (119), wherein the first chamfer has a first length, the second chamfer has a second length, and the first length is different than the second length.

Aspect (121) of this disclosure pertains to the HUD system of Aspect (120), wherein the first length is greater than the second length.

Aspect (122) of this disclosure pertains to the HUD system of Aspect (119), wherein the first chamfer has a first length, the second chamfer has a second length, and the first length is different than the second length, wherein the first length is measured in a direction that is in-plane with the first major surface at the intersection with the first chamfer and is measured from the first end of the first chamfer to a plane that is co-planar with the minor surface at the second end of the first chamfer, and wherein the second length is measured in a direction that is in-plane with the second major surface and is measured from the first end of the second chamfer to a plane that is co-planar with the minor surface at the second end of the second chamfer.

Aspect (123) of this disclosure pertains to the HUD system of any one of Aspects (120)-(122), wherein the first length is at least about 1.0 mm.

Aspect (124) of this disclosure pertains to the HUD system of Aspect (12), wherein the first length is from about 1.0 mm to about 3.0 mm.

Aspect (125) of this disclosure pertains to the HUD system of any one of Aspects (118)-(124), wherein the first chamfer comprises a first inclined surface at a first angle measured with respect to the first surface, wherein the first inclined surface intersects the first major surface at a first distance of about 0.5 mm to about 3 mm from a minor plane co-planar with the minor surface at the second end of the first chamfer, and intersects the minor surface at a second distance of about 0.2 mm to about 0.3 mm from a first major plane co-planar with the first major surface at the first end of the first chamfer.

Aspect (126) of this disclosure pertains to the HUD system of Aspect (125), wherein the second chamfer comprises a second inclined surface at a second angle measured with respect to the second surface, wherein the second inclined surface intersects the second major surface at a first distance of about 0.2 mm to about 0.3 mm from a minor plane co-planar with the minor surface at the second end of the second chamfer, and intersects the minor surface at a second distance of about 0.2 mm to about 0.3 mm from a second major plane co-planar with the second major surface at the first end of the first chamfer.

Aspect (127) of this disclosure pertains to the HUD system of Aspect (126), wherein the first angle is about 3 degrees to about 31 degrees, and the second angle is about 33 degrees to about 57 degrees.

Aspect (128) of this disclosure pertains to the HUD system of Aspect (126), wherein the first angle is from about 5 degrees to about 45 degrees, and the second angle is from about 5 degrees to about 45 degrees.

Aspect (129) of this disclosure pertains to the HUD system of any one of Aspects (118)-(124), wherein the first chamfer comprises a first inclined surface at a first angle measured with respect to the first surface, and the second chamfer comprises a second inclined surface at a second angle measured with respect to the second surface, and wherein the first angle is different than the second angle.

Aspect (130) of this disclosure pertains to the HUD system of Aspect (129), wherein the first angle is smaller than the second angle.

Aspect (131) of this disclosure pertains to the HUD system of any one of Aspects (115)-(127), wherein the first major surface has a first radius of curvature such that the first major surface has a concave shape and the second major surface has a convex shape, the first radius of curvature being measured relative to a first axis of curvature.

Aspect (132) of this disclosure pertains to the HUD system of Aspect (131), wherein the first major surface has a second radius of curvature that is measured relative to a second axis of curvature that is different from the first axis of curvature.

Aspect (133) of this disclosure pertains to the HUD system of Aspect (132), wherein the first axis of curvature is perpendicular to the second axis of curvature.

Aspect (134) of this disclosure pertains to the HUD system of any one of Aspects (118)-(133), wherein the first major surface has an aspheric shape.

Aspect (135) of this disclosure pertains to the HUD system of Aspect (134), wherein the aspheric shape corresponds to a shape of the projection surface.

Aspect (136) of this disclosure pertains to the HUD system of any one of Aspects (118)-(135), wherein the first major surface that is reflective comprises a reflective coating on the glass-based substrate.

Aspect (137) of this disclosure pertains to the HUD system of Aspect (136), wherein the reflective coating comprises a metal, a metal oxide, a ceramic oxide, or a metal-ceramic alloy.

Aspect (138) of this disclosure pertains to the HUD system of Aspect (137), wherein the metal is aluminum or silver.

Aspect (139) of this disclosure pertains to the HUD system of any one of Aspects (118)-(124) and (127)-(138), wherein a length of the first inclined surface as measured in a direction parallel to the first major surface is about 0.5 mm to 3 mm, and a length of the first inclined surface as measured in a direction parallel to the minor surface is about 0.2 mm to 0.3 mm.

Aspect (140) of this disclosure pertains to the HUD system of any one of Aspects (118)-(124) and (127)-(139), wherein a length of the second inclined surface as measured in a direction parallel to the second major surface is about 0.2 mm to 0.3 mm, and a length of the second inclined surface as measured in a direction parallel to the minor surface is about 0.2 mm to 0.3 mm.

Aspect (141) of this disclosure pertains to the HUD system of any one of Aspects (118)-(140), wherein the display unit comprises an LCD, LED, OLED, or µLED display panel.

Aspect (142) of this disclosure pertains to the HUD system of claim any one of Aspects (118)-(141), wherein the display unit is a projector.

Aspect (143) of this disclosure pertains to the HUD system of any one of Aspects (118)-(142), wherein the glass-based substrate has a thickness that is less than or equal to 3.0 mm.

Aspect (144) of this disclosure pertains to the HUD system of Aspect (143), wherein the thickness of the glass-based substrate is from about 0.5 mm to about 3.0 mm.

Aspect (145) of this disclosure pertains to the HUD system of Aspect (144), wherein the thickness of the glass-based substrate is from about 0.5 mm to about 1.0 mm.

Aspect (146) of this disclosure pertains to the HUD system of Aspect (144), wherein the thickness of the glass-based substrate is from about 1.0 mm to about 3.0 mm.

Aspect (147) of this disclosure pertains to the HUD system of any one of Aspects (118)-(146), wherein the chamfering of the first major surface is configured to reduce edge distortion of the projected image.

Aspect (148) of this disclosure pertains to the HUD system of any one of Aspects (118)-(146), wherein the chamfering of the first major surface is configured to reduce an amount of unwanted light reflected toward the user.

Aspect (149) of this disclosure pertains to the HUD system of any one of Aspects (118)-(148), wherein the projection surface is a windshield of a vehicle.

Aspect (150) of this disclosure pertains to the HUD system of any one of Aspects (118)-(148), wherein the projection surface is a combiner configured to be mounted in a vehicle interior.

Aspect (151) of this disclosure pertains to a heads-up display (HUD) projection system, comprising: a display unit configured to display an image to be viewed by a user of a HUD system; and a mirror configured to reflect the image to a viewing area viewable by the user, the mirror comprising: a glass-based substrate having a first major surface that is reflective, a second major surface opposite to the first major surface, and a minor surface connecting the first and second major surfaces, and a chamfer at an edge of the first major surface, the chamfer having a first length.

Aspect (152) of this disclosure pertains to the HUD projection system of Aspect (151), wherein the first length is measured in a direction that is in-plane with the first major surface and is measured from an intersection of the first inclined surface and the first major surface to a plane that is co-planar with the minor surface, and wherein the first length is at least about 1.0 mm.

Aspect (153) of this disclosure pertains to the HUD projection system of Aspect (151) or Aspect (152), wherein the first length is from about 1.0 mm to about 3.0 mm.

Aspect (154) of this disclosure pertains to the HUD projection system of any one of Aspects (151)-(153), wherein the chamfer intersects the first major surface at about 0.5 mm to about 3 mm from a first plane co-planar with the minor surface, and intersects the minor surface at about 0.2 mm to about 0.3 mm from a second plane co-planar with the first major surface.

Aspect (155) of this disclosure pertains to the HUD projection system of any one of Aspects (151)-(154), wherein the mirror has a first radius of curvature such that the first major surface has a concave shape and the second major surface has a convex shape, the first radius of curvature being relative to a first axis of curvature.

Aspect (156) of this disclosure pertains to the HUD projection system of Aspect (155), wherein the mirror has a second radius of curvature that is relative to a second axis of curvature different from the first axis of curvature.

Aspect (157) of this disclosure pertains to the HUD projection system of Aspect (156), wherein the first axis of curvature is perpendicular to the second axis of curvature.

Aspect (158) of this disclosure pertains to the HUD projection system of any one of Aspects (151)-(157), wherein the first major surface has an aspheric shape.

Aspect (159) of this disclosure pertains to the HUD projection system of any one of Aspects (151)-(158), wherein the first major surface that is reflective comprises a reflective coating on the glass-based substrate.

Aspect (160) of this disclosure pertains to the HUD projection system of Aspect (159), wherein the reflective coating comprises a metal, a metal oxide, a ceramic oxide, or a metal-ceramic alloy.

Aspect (161) of this disclosure pertains to the HUD projection system of Aspect (159) or Aspect (160), wherein the reflective coating comprises aluminum or silver.

Aspect (162) of this disclosure pertains to the HUD projection system of any one of Aspects (151)-(161), wherein the display unit comprises an LCD, LED, OLED, or μLED display panel.

Aspect (163) of this disclosure pertains to the HUD projection system of any one of Aspects (151)-(162), wherein the display unit is a projector.

Aspect (164) of this disclosure pertains to the HUD projection system of any one of Aspects (151)-(163), wherein the glass-based substrate has a thickness that is less than or equal to 3.0 mm.

Aspect (165) of this disclosure pertains to the HUD projection system of Aspect (164), wherein the thickness of the glass-based substrate is from about 0.5 mm to about 3.0 mm.

Aspect (166) of this disclosure pertains to the HUD projection system of Aspect (165), wherein the thickness of the glass-based substrate is from about 0.5 mm to about 1.0 mm.

Aspect (167) of this disclosure pertains to the HUD projection system of Aspect (165), wherein the thickness of the glass-based substrate is from about 1.0 mm to about 3.0 mm.

Aspect (168) of this disclosure pertains to the HUD projection system of any one of Aspects (161)-(167), further comprising a projection surface for viewing a projected image by a user of the HUD system, wherein the display unit configured to produce an image, and the mirror is configured to reflect the image to form the projected image on the projection surface.

Aspect (169) of this disclosure pertains to the HUD projection system of Aspect (168), wherein the projection surface has a shape that is substantially the same as a shape of the mirror.

Aspect (170) of this disclosure pertains to the HUD projection system of Aspect (168) or Aspect (169), wherein the projection surface is a windshield or a combiner.

Aspect (171) of this disclosure pertains to the HUD projection system of any one of Aspects (168)-(170), wherein the projection surface has an aspheric shape.

Aspect (172) of this disclosure pertains to the HUD projection system of Aspect (153), wherein the second major surface comprises one or more manufacturing artifacts, and wherein the manufacturing artifacts are confined to a perimeter region of the second major surface at a distance from the edge of the second major surface that is less than the first length.

Aspect (173) of this disclosure pertains to the HUD projection system of Aspect (172), wherein the manufacturing artifacts are vacuum suction artifacts from a process of bending the mirror.

Aspect (174) of this disclosure pertains to the glass-based preform of any one of Aspects (1)-(26), wherein the glass-based preform comprises strengthened glass.

Aspect (175) of this disclosure pertains to the glass-based preform of Aspect (174), wherein the strengthened glass is chemically strengthened.

Aspect (176) of this disclosure pertains to the method of any one of Aspects (33)-(58), wherein the glass-based mirror preform comprises strengthened glass.

Aspect (177) of this disclosure pertains to the method of Aspect (176), wherein the strengthened glass is chemically strengthened.

Aspect (178) of this disclosure pertains to the HUD projection system of any one of Aspects (59)-(92), wherein the glass-based substrate comprises strengthened glass.

Aspect (179) of this disclosure pertains to the HUD projection system of Aspect (178), wherein the strengthened glass is chemically strengthened.

While this description may include many specifics, these should not be construed as limitations on the scope thereof, but rather as descriptions of features that may be specific to particular embodiments. Certain features that have been heretofore described in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and may even be initially claimed as such, one or more features from a claimed combination may in some cases be excised from the combination, and the claimed combination may be directed to a sub-combination or variation of a sub-combination.

Similarly, while operations are depicted in the drawings or figures in a particular order, this should not be understood as requiring that such operations be performed in the particular order shown or in sequential order, or that all illustrated operations be performed, to achieve desirable results. In certain circumstances, multitasking and parallel processing may be advantageous Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is also noted that recitations herein refer to a component of the present disclosure being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

As shown by the various configurations and embodiments illustrated in the figures, various glass-based structures for head-up displays have been described.

While preferred embodiments of the present disclosure have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What is claimed is:

1. A glass-based preform for a mirror of a heads-up display (HUD) system, comprising:
   a glass-based substrate having a first major surface, a second major surface opposite to the first major surface, and a minor surface connecting the first and second major surfaces;
   a first chamfer at an edge of the first major surface, the first chamfer having a first end at an intersection of the first chamfer and the first major surface and having a second end at an intersection of the first chamfer and the minor surface; and a second chamfer at an edge of the second major surface, the second chamfer having a first end at an intersection of the second chamfer and the second major surface and having a second end at an intersection of the second chamfer and the minor surface, wherein the first major surface has a concave shape,
wherein the second major surface has a convex shape,
wherein the first chamfer has a greater size than the second chamfer.

2. The glass-based preform of claim 1, wherein the first chamfer has a first length, the second chamfer has a second length, and the first length is different than the second length.

3. The glass-based preform of claim 2, wherein the first length is measured in a direction that is in-plane with the first major surface at the intersection with the first chamfer and is measured from the first end of the first chamfer to a plane that is co-planar with the minor surface at the second end of the first chamfer, and wherein the second length is measured in a direction that is in-plane with the second major surface and is measured from the first end of the second chamfer to a plane that is co-planar with the minor surface at the second end of the second chamfer.

4. The glass-based preform of claim 2, wherein the first length is from about 1.0 mm to about 3.0 mm.

5. The glass-based preform of claim 1, wherein the first chamfer comprises a first inclined surface at a first angle measured with respect to the first surface, wherein the first inclined surface intersects the first major surface at a first distance of about 0.5 mm to about 3 mm from a minor plane co-planar with the minor surface at the second end of the first chamfer, and intersects the minor surface at a second distance of about 0.2 mm to about 0.3 mm from a first major plane co-planar with the first major surface at the first end of the first chamfer;

wherein the second chamfer comprises a second inclined surface at a second angle measured with respect to the second surface, wherein the second inclined surface intersects the second major surface at a first distance of about 0.2 mm to about 0.3 mm from a minor plane co-planar with the minor surface at the second end of the second chamfer, and intersects the minor surface at a second distance of about 0.2 mm to about 0.3 mm from a second major plane co-planar with the second major surface at the first end of the first chamfer, and wherein the first angle is about 3 degrees to about 31 degrees, and the second angle is about 33 degrees to about 57 degrees, or wherein the first angle is from about 5 degrees to about 45 degrees, and the second angle is from about 5 degrees to about 45 degrees.

6. The glass-based preform of claim 1, wherein the first chamfer comprises a first inclined surface at a first angle measured with respect to the first surface, and the second chamfer comprises a second inclined surface at a second angle measured with respect to the second surface, and wherein the first angle is different than the second angle.

7. The glass-based preform of claim 5, wherein the first inclined surface extends from the first edge to the second edge of the first chamfer, and wherein the second inclined surface extends from the first edge to the second edge of the second chamfer.

8. The glass-based preform of claim 1, wherein at least a portion of the first major surface is reflective.

9. The glass-based preform of claim 8, wherein the portion of the first major surface that is reflective comprises a reflective coating on the glass-based substrate.

10. The glass-based preform of claim 6, wherein a length of the first inclined surface as measured in a direction parallel to the first major surface is about 0.5 mm to 3 mm, and a length of the first inclined surface as measured in a direction parallel to the minor surface is about 0.2 mm to 0.3 mm.

11. The glass-based preform of claim 6, wherein a length of the second inclined surface as measured in a direction parallel to the second major surface is about 0.2 mm to 0.3 mm, and a length of the second inclined surface as measured in a direction parallel to the minor surface is about 0.2 mm to 0.3 mm.

12. The glass-based preform of claim 1, wherein the second major surface comprises one or more manufacturing artifacts, and wherein the manufacturing artifacts are confined to a perimeter region of the second major surface, the perimeter region extending from the edge of the second major surface to a distance that is less than the first length.

13. The glass-based preform of claim 12, wherein the manufacturing artifacts are vacuum suction artifacts.

14. A mirror for a heads-up display (HUD) system comprising the glass-based preform of claim 1.

15. The mirror of claim 14, further comprising a reflective layer on the first major surface of the glass-based preform.

16. The mirror of claim 14, wherein the first major surface has an aspheric shape.

17. A method of forming a three-dimensional mirror, the method comprising:

providing a glass-based mirror preform having a first major surface, a second major surface opposite to the first major surface, and a minor surface connecting the first and second major surfaces, the glass preform having a flat shape;

forming a first chamfer at an edge of the first major surface;

forming a second chamfer at an edge of the second major surface, the second chamfer having a smaller size than the first chamfer;

disposing the glass-based preform on a molding apparatus having a curved support surface with the second major surface facing the curved support surface; and conforming the glass-based preform to the curved support surface to form a curved mirror substrate having a first radius of curvature, wherein, after the conforming, the first major surface has a concave shape and the second major surface has a convex shape.

18. A heads-up display (HUD) projection system, comprising:

a display unit configured to display an image to be viewed by a user of a HUD system; and a mirror configured to reflect the image to a viewing area viewable by the user, the mirror comprising:

a glass-based substrate having a first major surface that is reflective, a second major surface opposite to the first major surface, and a minor surface connecting the first and second major surfaces, and a chamfer at an edge of the first major surface, the chamfer having a first length, wherein the second major surface comprises one or more manufacturing artifacts, and wherein the manufacturing artifacts are confined to a perimeter region of the second major surface, the perimeter region extending from the edge of the second major surface to a distance that is less than the first length.

* * * * *

UNITED STATES PATENT AND TRADEMARK OFFICE
CERTIFICATE OF CORRECTION

PATENT NO. : 11,768,369 B2
APPLICATION NO. : 16/766013
DATED : September 26, 2023
INVENTOR(S) : BongChul Kim et al.

It is certified that error appears in the above-identified patent and that said Letters Patent is hereby corrected as shown below:

On the Title Page

On the page 5, in Column 2, under Item (56) "Other Publications", Line 23, delete "atglasstec," and insert -- at glasstec, --.
On the page 5, in Column 2, under Item (56) "Other Publications", Line 28, delete "Fauercia" and insert -- Faurecia --.
On the page 6, in Column 1, under Item (56) "Other Publications", Line 5, delete "Pegaton" and insert -- Pegatron --.
On the page 6, in Column 1, under Item (56) "Other Publications", Line 6, delete "Cnsole" and insert -- Console --.
On the page 6, in Column 2, under Item (56) "Other Publications", Line 29, delete "Internaitonal" and insert -- International --.
On the page 6, in Column 2, under Item (56) "Other Publications", Line 34, delete "Faade" and insert -- Facade --.
On the page 6, in Column 2, under Item (56) "Other Publications", Line 35, delete "Faade"," and insert -- Facade", --.

In the Claims

In Column 39, Line 40, in Claim 5, delete "chamfer;" and insert -- chamfer, --.

Signed and Sealed this
Thirteenth Day of February, 2024

Katherine Kelly Vidal
*Director of the United States Patent and Trademark Office*